US011920480B1

(12) United States Patent
Werner et al.

(10) Patent No.: US 11,920,480 B1
(45) Date of Patent: Mar. 5, 2024

(54) TURBINE FOR A CHARGING DEVICE

(71) Applicant: BorgWarner Inc., Auburn Hills, MI (US)

(72) Inventors: Patrick Werner, Neuhofen (DE); Oliver Haase, Katzenbach (DE); Tim Weiland, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/107,625

(22) Filed: Feb. 9, 2023

(30) Foreign Application Priority Data

Dec. 16, 2022 (DE) ..................... 10 2022 213 812.0

(51) Int. Cl.
*F01D 17/12* (2006.01)
*F01D 9/06* (2006.01)
*F01D 25/24* (2006.01)
*F02B 37/00* (2006.01)

(52) U.S. Cl.
CPC ............... *F01D 17/12* (2013.01); *F01D 9/06* (2013.01); *F01D 25/24* (2013.01); *F02B 37/00* (2013.01); *F05D 2220/40* (2013.01); *F05D 2240/12* (2013.01)

(58) Field of Classification Search
CPC . F01D 17/12; F01D 9/06; F01D 25/24; F02B 37/00; F05D 2220/40; F05D 2240/12
USPC ........................................................ 60/605.1
See application file for complete search history.

(56) References Cited

U.S. PATENT DOCUMENTS

| | | | | |
|---|---|---|---|---|
| 6,260,358 | B1 * | 7/2001 | Daudel | F02M 26/43 415/45 |
| 2005/0056015 | A1 * | 3/2005 | Fledersbacher | F01D 17/167 60/602 |
| 2015/0013330 | A1 * | 1/2015 | Kindl | F02B 37/24 60/605.1 |
| 2016/0025044 | A1 * | 1/2016 | Martinez-Botas | F02B 37/24 60/605.2 |
| 2017/0107896 | A1 * | 4/2017 | Gugau | F02B 37/025 |

* cited by examiner

*Primary Examiner* — J. Todd Newton
(74) *Attorney, Agent, or Firm* — Eric L. Doyle; Stephan A. Pendorf; Patent Central LLC

(57) ABSTRACT

A turbine (10) for a charging device (1) with a turbine housing (100) with a feed duct assembly (200), a turbine outlet duct (110) and a receptacle space (120). The feed duct assembly (200) includes a first feed duct (210) having a first fluid inlet portion (211) and a first fluid outlet portion (212), and a second feed duct (220) having a second fluid inlet portion (221) and a second fluid outlet portion (222). The first fluid outlet portion (212) extends across a first angular range (α1) about the guide installation (400). The second fluid outlet portion (222) extends across a second angular range (α2) about the guide installation (400). The first angular range (α1) is larger than the second angular range (α2). The first fluid inlet portion (211) and the second fluid inlet portion (221) are mutually spaced apart in the circumferential direction (26).

27 Claims, 8 Drawing Sheets

TURBINE FOR A CHARGING DEVICE

TECHNICAL FIELD

The present invention relates to a turbine for a charging device, to a charging device having a turbine of this type, and to an engine system having a charging device of this type.

BACKGROUND

Ever more vehicles of the newer generation are equipped with charging devices in order to achieve the target requirements and statutory stipulations. In the development of charging devices, it is an objective to optimize the individual components as well as the system in its entirety in terms of their reliability and efficiency.

Known charging devices in most instances have a compressor having a compressor wheel which by way of a common shaft is connected to a drive unit. The compressor compresses the fresh air inducted for the internal combustion engine or for the fuel cell. As a result, the quantity of air or oxygen which is available to the engine for combustion, or available to the fuel cell for reaction, is increased. This in turn leads to an increase in the output of the internal combustion engine or of the fuel cell, respectively. Charging devices can be equipped with different drive units. Known in the prior art are in particular E-chargers in which the compressor is driven by way of an electric motor and turbochargers in which the compressor is driven by way of a turbine, in particular a radial turbine. As opposed to an axial turbine (as is provided in aircraft engines, for example) in which the inflow takes place substantially exclusively in an axial manner, the exhaust gas flow in a radial turbine by a spiral-shaped turbine inlet is guided in a substantially radial manner, and, in the case of a mixed-flow radial turbine, in a semi-radial manner, thus at least with a minor axial component, onto the turbine wheel. Apart from the E-charger and the turbocharger, combinations of both systems, which are also referred to as E-turbo, are described in the prior art.

In order to increase the efficiency of turbines and adapt said efficiency to different operating points, modern charging devices are equipped with an output adjustment installation with the aid of which the generation of output of the charging device can be adjusted or varied, respectively. Known output adjustment installations include, for example, guide installations having adjustable guide vanes, or a waste gate flap (WG). A guide installation having adjustable or variable guide vanes is often also referred to as a variable turbine geometry (VTG), variable guide vanes, guide grid, or VTG guide grid. A guide installation having adjustable guide vanes is an adjustable guide apparatus for varying an inflow to a turbine wheel of the turbine. By varying the inflow (for example the flow cross section and the angle of incident flow) by adjusting the guide vanes, the flow velocity of the fluid flow, in particular exhaust gas flow, fed to the turbine wheel can in particular be varied, this leading to a corresponding change in the output of the charging device. Moreover, known systems have guide installations with fixed guide vanes. A guide installation having fixed guide vanes can also be referred to as a rigid or fixed blade geometry. A guide installation having fixed guide vanes is known for optimizing individual or several specific operating points of the turbine. As opposed to the adjustable guide vanes, the fixed guide vanes here are not adjustable (in particular not rotatable or pivotable about an axis) but disposed in a fixed orientation relative to the turbine housing such that the flow cross section and the angle of incident flow, once established, can no longer be variably adjusted but are established in an optimized manner for a single operating point or several specific operating points.

In current developments of internal combustion engines in combination with charging devices, it is important to provide a high efficiency of the turbine, or of the charging device and/or of the internal combustion engine in association with low emissions, in particular of nitrous oxide and soot. Known internal combustion engines have a plurality of cylinders which can fire sequentially. The cylinders have outlet ducts which by the sequential firing can be opened at different times. If only one exhaust gas manifold by way of which the exhaust gas is fed to the turbine is used, pressure pulses as a consequence of the opening of outlet valves while exhausting the exhaust gas can negatively influence those cylinders during charge changing in which the outlet valves are in the closing procedure—and ultimately return hot exhaust gas back into these cylinders. This may lead to an increase in knocking tendency and/or to a reduction in terms of a fresh gas charging mass. Known turbines have a turbine housing in which the turbine wheel and the guide installation are disposed. In order to reduce or eliminate the issues mentioned above, known turbine housings can have two volutes (or spirals, respectively) which are fluidically separated from one another and feed fluid, in particular exhaust gas, separately and in each case by way of a specific region to the turbine wheel. Such turbine housings prove successful in particular when the charging device is used conjointly with an internal combustion engine (e.g. a four-stroke petrol engine or a diesel engine). Each volute can be connected to a respective cylinder group (i.e. to a plurality of cylinders) of the internal combustion engine and as a result bring about an increased efficiency of the internal combustion engine as well as of the turbine, because reciprocal effects of individual cylinders can be reduced and high pressure pulses can increasingly be fed to the turbine wheel as a result of the separate feed to the turbine housing. This improved technology for impinging the turbine wheel with exhaust gas can also be referred to as pulse-charging. However, in known turbine housings in conjunction with the respective cylinder groups, exhaust gas mass flows between the volutes and, as a result, an increased pressure level downstream of the respective cylinders may arise during the operation of the internal combustion engine. Moreover, an impaired incident flow to the turbine wheel and thus a lower efficiency of the turbine may often be caused by known turbine housings. As a result of the increased pressure level, charge changing of the respective cylinders (i.e. an exchange of combusted exhaust gas and combustible fresh gas, e.g. a fuel/air mixture, in a combustion chamber of the respective cylinders), and in particular a purging procedure, that is to say the exhausting of exhaust gas from the cylinders, may be impaired. As a result, increasingly more exhaust gas may remain in the individual cylinders when charge changing, an efficiency of subsequent combustions and thus of the internal combustion engine may decrease, and emissions may increase. Moreover, attaching the volutes of the turbine to the cylinder groups is often difficult by virtue of the small amount of installation space in passenger and/or commercial vehicles in which the internal combustion engine and the charging device having the turbine are used. Moreover, known turbines are often associated with high costs and a high complexity in terms of maintenance.

It is an object of the present invention to provide an improved and more efficient turbine for a charging device.

SUMMARY OF THE INVENTION

The present invention relates to a turbine for a charging device, a charging device having a turbine of this type, and an engine system having a turbine of this type. The dependent claims describe advantageous design embodiments of the turbine, of the charging device and of the engine system.

According to a first aspect of the present invention, a turbine for a charging device comprises a turbine housing, wherein the turbine housing comprises a feed duct assembly, a turbine outlet duct and a receptacle space. The receptacle space is fluidically connected to the feed duct assembly and the turbine outlet duct. Moreover, the turbine comprises a turbine wheel which in the receptacle space is disposed between the feed duct assembly and the turbine outlet duct. Moreover, the turbine comprises a guide installation, wherein the guide installation in the receptacle space is disposed radially outside the turbine wheel and circumferentially surrounds the turbine wheel. The feed duct assembly comprises a first feed duct having a first fluid inlet portion and a first fluid outlet portion, and a second feed duct having a second fluid inlet portion and a second fluid outlet portion. The first fluid outlet portion extends across a first angular range about the guide installation. The second fluid outlet portion extends across a second angular range about the guide installation. The first angular range is larger than the second angular range. The first fluid inlet portion and the second fluid inlet portion are mutually spaced apart in the circumferential direction.

An efficiency of a charging device, in particular of an exhaust gas turbocharger, can be increased by means of the turbine according to the invention. Moreover, a separation of cylinder groups (i.e. an assembly of one or a plurality of cylinders in a respective cylinder group or, if present, on a respective bank of cylinders), in particular an improved separation of cylinder groups, of the internal combustion engine can be provided. Moreover, improved charge changing of the internal combustion engine can be provided. As a result of the design embodiment of the turbine housing according to the invention, having the feed duct assembly, a pressure level when exhausting the respective cylinders of a cylinder group can be reduced (i.e. downstream of the respective cylinders, in particular of the combustion chambers, of an internal combustion engine), and improved charge changing of the individual cylinders can be achieved. Moreover, mass flows of exhaust gas between the individual cylinder groups can be reduced. The charge changing can be provided more efficiently because a purging procedure, in particular the exhausting of exhaust gas from the cylinders (i.e. from the combustion chambers) can be improved as a result of the reduced pressure level, with less exhaust gas remaining in the respective cylinders and subsequent combustion with fresh air therefore being able to be designed more efficiently. Moreover, emissions of incompletely combusted hydrocarbons can be reduced, this potentially leading to a more ecologically friendly operation of the turbine, of the charging device and/or of the internal combustion engine. Moreover, an improved ignition point of the individual cylinders can be achieved, and an exhaust gas temperature upstream of the turbine wheel can be reduced. As a result of the reduced exhaust gas temperature, a reduced thermal transfer to other components such as, for example, a bearing housing and/or a compressor housing to which the turbine is coupled, can be provided. Moreover, aging of the catalytic converter can be delayed by lowering a catalytic converter temperature at the nominal output of the internal combustion engine. As a result of the first fluid inlet portion and the second fluid inlet portion being mutually spaced apart in the circumferential direction, it is possible to provide a better link between the turbine and a first and a second cylinder group. If an internal combustion engine of the V construction mode is provided, in particular in which two banks of cylinders are mutually disposed in a V-shape, one cylinder group can in each case be provided on one bank of cylinders. Especially in this design embodiment, the turbine can be provided between the banks of cylinders, and the turbine can be better linked as a result of the spacing between the first fluid inlet portion and the second fluid inlet portion. Moreover, the turbine housing and the turbine can be provided at lower costs and with a small degree of complexity in terms of maintenance.

In design embodiments, the first feed duct can define a first tongue end between the first fluid inlet portion and the first fluid outlet portion. The second fluid duct can define a second tongue end between the second fluid inlet portion and the second fluid outlet portion. The respective tongue end here can be defined as the location of the turbine housing where the respective fluid inlet, in particular the respective fluid inlet portion, opens into the turbine housing, in particular into the receptacle space. The respective tongue end here can be defined as the location of the respective fluid inlet portion that has a smallest duct cross section of the fluid inlet portion.

In design embodiments, the first angular range between the first tongue end and the second tongue end can be measured in relation to a rotation axis of the turbine wheel. The second angular range between the second tongue end and the first tongue end can be measured in relation to a rotation axis.

In design embodiments, the first fluid outlet portion and the second fluid outlet portion can be of an asymmetric design. The guide installation can have an odd number of guide vanes. As a result of the asymmetric design embodiment, this odd number of guide vanes can be taken into account, an improved incident flow of the guide installation and/or of the turbine wheel, and/or an improved separation of cylinder groups can be provided.

In design embodiments, the first feed duct can be able to be connected to a first cylinder group of an internal combustion engine. In design embodiments, the second feed duct can be able to be connected to a second cylinder group of the internal combustion engine.

In design embodiments, the first fluid inlet portion can have a first inlet. The second fluid inlet portion can have a second inlet. The first inlet and the second inlet in the circumferential direction can be spaced apart by an inlet portion angle. The inlet portion angle can be more than 10°, more specifically more than 20°, in particular more than 45°. As a result of the spacing in the circumferential direction, a better link between the turbine and the cylinder groups and an improved inflow to the turbine wheel can be achieved.

In design embodiments, a first tongue spacing can be defined between an external circumference of the guide installation and the first tongue end. A second tongue spacing can be defined between the external circumference of the guide installation and the second tongue end. In particular, the first tongue spacing and the second tongue spacing can in each case be measured in the radial direction in relation to the rotation axis of the turbine wheel.

In design embodiments, the first fluid outlet portion can have a first portion length. The second fluid outlet portion can have a second portion length. The first portion length between the first tongue end and the second tongue end can be measured along a central axis of the first fluid outlet portion. The second portion length between the second tongue end and the first tongue end can be measured along a central axis of the second fluid outlet portion.

In design embodiments, the first fluid outlet portion can have a first portion volume. The second fluid outlet portion can have a second portion volume. In particular, the first portion volume and the second portion volume can in each case be defined between the first tongue end and the second tongue end.

In design embodiments, the first feed duct can have a first duct cross-sectional area. The second feed duct can have a second duct cross-sectional area. In particular, the first duct cross-sectional area on the first tongue end can be smaller than the second duct cross-sectional area on the second tongue end.

In a first embodiment of the turbine, which can be combined with all design embodiments described above, the first fluid outlet portion can form a first volute. The second fluid outlet portion can form a second volute. The first volute and the second volute can be designed and disposed in such a manner that a fluid mass flow between the first fluid outlet portion and the second fluid outlet portion is impeded upstream of the guide installation. Mixing of fluids between the individual feed ducts, in particular the fluid outlet portions, can be minimized by reducing the tongue spacing between the guide installation and the respective tongue ends. As a result, apart from the improved separation of cylinder groups, an improved fluid flow, in particular an increased pressure pulse, to the turbine wheel can be provided. Furthermore, a fluid mass flow between the cylinder groups can be reduced.

In design embodiments of the first embodiment of the turbine, which can be combined with all design embodiments described above, the first fluid outlet portion and the second fluid outlet portion can be of a spiral-shaped design.

In design embodiments of the first embodiment of the turbine, which can be combined with all design embodiments described above, the first angular range can be between 181° and 250°, in particular between 185° and 220°.

In design embodiments of the first embodiment of the turbine, which can be combined with all design embodiments described above, the first tongue spacing can be smaller than the second tongue spacing. In particular, a ratio of the first tongue spacing to the second tongue spacing can be between 0.80 and 1.00, preferably between 0.85 and 0.98.

In design embodiments of the first embodiment of the turbine, which can be combined with all design embodiments described above, a ratio of the first tongue spacing z1 to a diameter d of the turbine wheel 300 can be between 0.05 and 0.25, in particular between 0.10 and 0.18. As a result of the minor tongue spacing, a better separation of cylinder groups (or, if present, separation of banks of cylinders), a reduced exchange of fluid mass between volutes or cylinder groups and/or a lower pressure level downstream of the combustion chambers can be provided such that a purging procedure can be facilitated.

In design embodiments of the first embodiment of the turbine, which can be combined with all design embodiments described above, the first portion length can be larger than the second portion length. A ratio of the first portion length to the second portion length can be between 1.02 and 1.3, in particular between 1.05 and 1.20. As a result, an odd number of guide vanes of the guide installation can be taken into account, and/or an improved incident flow of the guide installation or of the turbine wheel can be provided, respectively.

In design embodiments of the first embodiment of the turbine, which can be combined with all design embodiments described above, the first portion volume can be smaller than the second portion volume. A ratio of the first portion volume to the second portion volume can be between 0.70 and 0.98, in particular between 0.85 and 0.95.

In a second embodiment of the turbine, which can be combined with all design embodiments described above, the first fluid outlet portion and the second fluid outlet portion can form a common volute. The common volute can circumferentially surround the guide installation and be designed in such a manner that a fluid mass flow between the first fluid outlet portion and the second fluid outlet portion upstream of the guide installation can take place. Mixing of fluid between the fluid outlet portions can take place or be provided, respectively. In the process, an improved incident flow of the turbine wheel and/or of the guide installation can be provided because a smaller incident flow range of the guide installation is covered by the respective tongue ends. Moreover, a more homogenous incident flow of the turbine wheel can be provided. Nevertheless, as a result of the design embodiment according to the invention, an improved separation of cylinder groups and the above-described advantages of the turbine according to the invention can be provided. The aforementioned design embodiment may be required by virtue of the valve timings and spread angles which have been selected for the engine and are conceived in order for output targets to be met.

In design embodiments of the second embodiment of the turbine, which can be combined with all design embodiments described above, the first fluid outlet portion can be of a spiral-shaped design. In particular, the first duct cross-sectional area can decrease from the first tongue end towards the second tongue end.

In design embodiments of the second embodiment of the turbine, which can be combined with all design embodiments described above, the second duct cross-sectional area in a predominant region of the second fluid outlet portion between the second tongue end and the first tongue end can be almost constant.

In design embodiments of the second embodiment of the turbine, which can be combined with all design embodiments described above, the first angular range can be between 200° and 280°, in particular between 220° and 260°.

In design embodiments of the second embodiment of the turbine, which can be combined with all design embodiments described above, the first tongue spacing can be larger than the second tongue spacing. A ratio of the first tongue spacing to the second tongue spacing can be between 1.20 and 1.90, in particular between 1.50 and 1.70.

In design embodiments of the second embodiment of the turbine, which can be combined with all design embodiments described above, a ratio of the first tongue spacing to a diameter of the turbine wheel can be between 0.25 and 0.50, in particular between 0.35 and 0.45.

In design embodiments of the second embodiment of the turbine, which can be combined with all design embodiments described above, the first portion length can be larger than the second portion length. A ratio of the first portion length to the second portion length can be between 2.20 and 3.00, in particular 2.50 and 2.75.

In design embodiments of the second embodiment of the turbine, which can be combined with all design embodiments described above, the first portion volume can be larger than the second portion volume. A ratio of the first portion volume to the second portion volume can be between 1.70 and 2.50, in particular between 2.05 and 2.25.

In design embodiments, which can be combined with all design embodiments, first embodiments and second embodiments of the turbine described above, the guide installation can comprise a carrier ring. In design embodiments, the guide installation can comprise a plurality of adjustable guide vanes, wherein the adjustable guide vanes are rotatably mounted in the carrier ring. Alternatively or additionally, the guide installation can comprise a plurality of fixed guide vanes, wherein the fixed guide vanes are fixedly disposed on the carrier ring so as to be in a predetermined orientation.

In design embodiments, which can be combined with all design embodiments, first embodiments and second embodiments of the turbine described above, the plurality of adjustable guide vanes and/or the plurality of fixed guide vanes can be disposed between the feed duct assembly and the turbine wheel and circumferentially surround the turbine wheel. In particular, fluid from the feed duct assembly can be directed by way of the plurality of adjustable guide vanes and/or by way of the plurality of fixed guide vanes onto the turbine wheel during operation. In design embodiments, the adjustable guide vanes can be disposed in the region of the first fluid outlet portion or in the region of the second fluid outlet portion. The fixed guide vanes can be disposed in the region of the respective other first fluid outlet portion or second fluid outlet portion.

In design embodiments, which can be combined with all design embodiments, first embodiments and second embodiments of the turbine described above, the guide installation can comprise a plurality of adjustable guide vanes and an adjustment ring. The adjustable guide vanes can be rotatably mounted in the carrier ring. The adjustment ring can comprise a plurality of coupling regions. Each adjustable guide vane of the plurality of adjustable guide vanes can be connected in a rotationally fixed manner to a respective vane lever. In particular, each vane lever can in each case be at least partially received in a coupling region for adjusting the respective adjustable guide vane.

In design embodiments, the adjustable guide vane can be connected in a rotationally fixed manner to a vane shaft on a first end of the vane shaft. The vane lever can be connected to the vane shaft on a second end of the vane shaft that lies opposite the first end.

In design embodiments, each vane lever can have a radial vane lever portion which extends radially from the vane shaft. Moreover, each vane lever can have an axial vane lever portion which extends axially towards the adjustment ring from the radial vane lever portion. In particular, the axial vane lever portion can extend axially at least partially into the respective coupling region.

In design embodiments, the guide installation can comprise a cover disc which can be disposed so as to be parallel to the carrier ring. The plurality of adjustable guide vanes and/or the plurality of fixed guide vanes can be disposed between the cover disc and the carrier ring.

In design embodiments, the adjustable guide vanes can be rotatably mounted in the carrier ring so as to be uniformly distributed across the vane shafts in the circumferential direction.

In design embodiments, the guide installation can have a plurality of spacer elements which can be disposed on the carrier ring so as to be distributed in the circumferential direction in such a manner that said spacer elements can define an axial spacing of the carrier ring from the cover disc. In particular, the plurality of spacer elements can comprise at least three spacer elements. A minimum clearance for the adjustment of the adjustable guide vanes can be ensured by the spacer elements.

In design embodiments, the guide installation can have an odd number of adjustable guide vanes.

In design embodiments, the plurality of adjustable guide vanes can be adjustable, in particular by means of a movement of the adjustment ring in the circumferential direction, between a first position, which corresponds to a position of the guide installation opened to the maximum, and a second position, which corresponds to a position of the guide installation opened to the minimum.

In design embodiments, the turbine can furthermore comprise an actuating installation which can be operatively coupled to the adjustment ring. The actuating installation can be conceived for moving the adjustment ring in the circumferential direction. In particular, the actuating installation can be coupled to the adjustment ring by way of one or a plurality of levers and/or a control bar.

In design embodiments, the guide installation can furthermore comprise an upstream guide grid which can circumferentially surround the carrier ring and/or the plurality of adjustable guide vanes. The upstream guide grid can have a plurality of fixed, flow-optimized spacer members. The fixed, flow-optimized spacer members can in each case be disposed between two adjacent adjustable guide vanes, in particular adjacent to the external circumference of the guide installation. A minimum clearance for the adjustment of the adjustable guide vanes can be ensured by the spacer members.

In design embodiments, the turbine can be a radial turbine.

In design embodiments, the turbine can furthermore comprise a bracing means. The bracing means in the axial direction can be disposed between the guide installation, in particular the carrier ring, and a turbine rear wall. The bracing means can be conceived for bracing the guide installation in relation to the turbine housing. The bracing means can be configured as a plate spring. In design embodiments, the bracing means on the radially outer end thereof can bear on the carrier ring, and on the radially inner end thereof can bear on the turbine rear wall. In design embodiments, a heat shield can be clamped between the bracing means and the carrier ring.

In design embodiments, the turbine rear wall can be configured as part of a bearing housing.

According to a second aspect of the present invention, a charging device for an internal combustion engine or a fuel cell comprises a bearing housing, a shaft which is rotatably mounted in the bearing housing, a compressor having a compressor wheel, and a turbine according to the first aspect of the present invention. The turbine wheel and the compressor wheel at opposite ends of the shaft are coupled in a rotationally fixed manner to the shaft. An efficiency of the turbine, of the charging device, in particular of an exhaust gas turbocharger, and/or of an internal combustion engine can be increased by means of the charging device according to the invention. Moreover, a separation of cylinder groups, in particular an improved separation of cylinder groups, of the internal combustion engine can be provided. Moreover, improved charge changing of an internal combustion engine can be provided. In particular, as a result of the design embodiment of the turbine according to the invention, having the feed duct assembly, a pressure level when exhausting the respective cylinders of a cylinder group can be reduced (i.e. downstream of the respective cylinders, in particular of the combustion chambers, of an internal combustion engine), and improved charge changing of the individual cylinders can be achieved. Moreover, mass flows of exhaust gas between the individual cylinder groups can be reduced. The charge changing can be provided more efficiently because a purging procedure, in particular the exhausting of exhaust gas from the cylinders (i.e. from the combustion chambers) can be improved as a result of the reduced pressure level, with less exhaust gas remaining in the respective cylinders and subsequent combustion with fresh air therefore being able to be designed more efficiently. Moreover, emissions of incompletely combusted hydrocarbons can be reduced, this potentially leading to a more ecologically friendly operation of the turbine, of the charging device and/or of the internal combustion engine. Moreover, an improved ignition point of the individual cylinders can be achieved, and an exhaust gas temperature upstream of the turbine wheel can be reduced. As a result of the reduced exhaust gas temperature, a reduced thermal transfer to other components such as, for example, a bearing housing and/or a compressor housing to which the turbine is coupled, can be provided. Moreover, aging of the catalytic converter can be delayed by lowering a catalytic converter temperature at the nominal output of the internal combustion engine. As a result of the first fluid inlet portion and the second fluid inlet portion being mutually spaced apart in the circumferential direction, it is possible to provide a better link between the turbine and a first and a second cylinder group. As a result of the improved and more efficient operation of the turbine, an improved and more efficient compression of fluid (e.g. fresh air) by the compressor can be provided, and an efficiency of the internal combustion engine can be improved as a result. Moreover, the turbine housing, the turbine and/or the charging device can be provided at lower costs and with a small degree of complexity in terms of maintenance.

In design embodiments, the compressor can comprise a compressor housing in which the compressor wheel is disposed. The bearing housing can be connected to the turbine housing and to the compressor housing.

In design embodiments, the turbine can furthermore comprise an electric motor. The electric motor can be disposed in a motor space in the bearing housing. The turbine wheel and/or the compressor wheel can be coupled to the electric motor by way of the shaft.

According to a third aspect of the present invention, an engine system comprises an internal combustion engine having a first cylinder group and a second cylinder group, and a charging device according to the second aspect of the present invention. The first feed duct downstream of the internal combustion engine is fluidically connected to the first cylinder group. The second feed duct downstream of the internal combustion engine is fluidically connected to the second cylinder group. An efficiency of the internal combustion engine, of the charging device and/or of the turbine can be increased by means of the engine system according to the invention. Moreover, an improved separation of cylinder groups of the internal combustion engine can be provided. Moreover, improved charge changing of an engine system can be provided. As a result of the design embodiment of the turbine according to the invention, having the feed duct assembly, a pressure level when exhausting the respective cylinders of a cylinder group can be reduced (i.e. downstream of the respective cylinders, in particular of the combustion chambers, of an internal combustion engine), and improved charge changing of the individual cylinders can be achieved. Moreover, mass flows of exhaust gas between the individual cylinder groups can be reduced. The charge changing can be provided more efficiently because a purging procedure, in particular the exhausting of exhaust gas from the cylinders (i.e. from the combustion chambers) can be improved as a result of the reduced pressure level, with less exhaust gas remaining in the respective cylinders and subsequent combustion with fresh air therefore being able to be designed more efficiently. Moreover, emissions of incompletely combusted hydrocarbons can be reduced, this potentially leading to a more ecologically friendly operation of the turbine, of the charging device and/or of the internal combustion engine. Moreover, an improved ignition point of the individual cylinders can be achieved, and an exhaust gas temperature upstream of the turbine wheel can be reduced. As a result of the reduced exhaust gas temperature, a reduced thermal transfer to other components such as, for example, a bearing housing and/or a compressor housing to which the turbine is coupled, can be provided. Moreover, aging of the catalytic converter can be delayed by lowering a catalytic converter temperature at the nominal output of the internal combustion engine. As a result of the first fluid inlet portion and the second fluid inlet portion being mutually spaced apart in the circumferential direction, it is possible to provide a better link between the turbine and a first and a second cylinder group (or, if present, a first bank of cylinders and a second bank of cylinders). As a result of the improved and more efficient operation of the turbine, an improved and more efficient compression of fluid (e.g. fresh air) by the compressors can be provided, and an efficiency of the internal combustion engine can be improved as a result. Moreover, the turbine housing, the turbine, the charging device and/or the engine system can be provided at lower costs and with a small degree of complexity in terms of maintenance.

In design embodiments, the first cylinder group and the second cylinder group can in each case have a plurality of cylinders having in each case one combustion chamber. In particular, the first cylinder group can be disposed on a first bank of cylinders, and the second cylinder group can be disposed on a second bank of cylinders. In other design embodiments, the first cylinder group and the second cylinder group can be disposed on one bank of cylinders.

In design embodiments, the engine system can furthermore comprise an inlet duct. The inlet duct can be disposed upstream of the internal combustion engine and be fluidically connected to the respective combustion chambers so as to feed inlet air to the combustion chambers. The engine system can moreover comprise an outlet duct which is disposed downstream of the internal combustion engine and is connected to the respective combustion chambers so as to discharge fluid, in particular exhaust gas, from the combustion chambers.

In design embodiments, the outlet duct can have a first outlet sub-duct which is fluidically connected to the combustion chambers of the first cylinder group. The outlet duct can have a second outlet sub-duct which is fluidically connected to the combustion chambers of the second cylinder group.

In design embodiments, the turbine can be disposed in the outlet duct. The first feed duct can be fluidically connected to the first outlet sub-duct. The second feed duct can be fluidically connected to the second outlet sub-duct.

In design embodiments, the compressor can be disposed in the inlet duct.

In design embodiments, a first lambda probe can be disposed downstream of the first cylinder group, in particular in the first outlet sub-duct. A second lambda probe can be disposed downstream of the second cylinder group, in particular in the second outlet sub-duct. An improved separation of cylinder groups (or, if present, a separation of banks of cylinders) can be provided by means of the turbine according to the invention. A combustion air ratio in the respective cylinder group (or, if present, bank of cylinders) can be determined by means of the first and the second lambda probes, said combustion air ratio in particular specifying a ratio of combustion air to fuel that is supplied to the inlet air in the combustion chamber. In the process, the combustion air ratio for the respective cylinder group can be determined by means of the measurements (e.g. whether a rich, balanced or lean combustion takes place) and correspondingly adjusted. The lambda probes can in particular compare a residual oxygen content in the exhaust gas with a reference oxygen content, for example of the air of the atmosphere. By means of the measurements and of the corresponding adjustment of the combustion air ratio (e.g. the fuel mixture generation and/or the injected fuel quantity into the respective combustion chambers), emissions can be reduced and a catalytic exhaust gas treatment can be improved. As a result of the separation of cylinder groups and the disposal of the lambda probes, better control of the internal combustion engine and/or the engine system can be provided.

DETAILED DESCRIPTION

Figure 1:
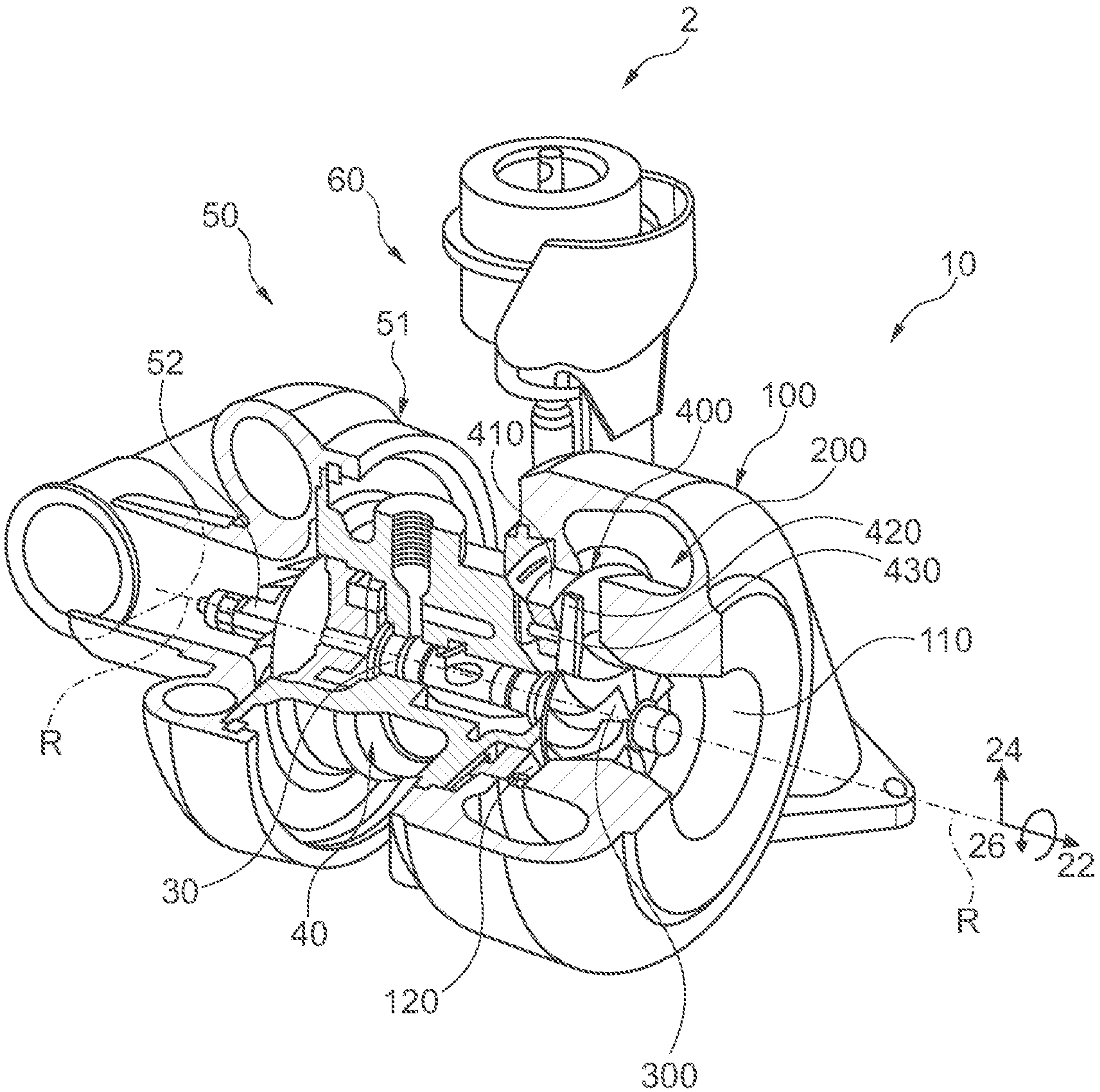
FIG. 1 shows an isometric view of a charging device having a turbine according to the invention and a compressor.

In the context of this application, the terms axial and axial direction refer to a rotation axis X of the shaft 30, or of the turbine wheel 300, of the rotation axis (or central axis) of the turbine 10, and/or of the guide installation 400. With reference to the figures (see FIGS. 1 to 8B, for example), the axial direction is denoted by the reference sign 22. A radial direction 24 here relates to the axial direction 22. Likewise, a circumference, or a circumferential direction 26, here relates to the axial direction 22. The directions 22 and 24 are mutually orthogonal.

FIG. 1 shows an exemplary charging device 2. In principle, the charging device 1 can be used for an internal combustion engine or a fuel cell, and/or be correspondingly conceived or sized, respectively.

As is illustrated in FIG. 1, the charging device 2 comprises a turbine 10, a bearing housing 40, a compressor 50, and an actuating installation 60. The charging device 2 here can be a turbocharger. In design embodiments, the charging device 2 can also be configured as an E-turbo (not shown in the FIGS.). The turbine 10 for the charging device 2 comprises a turbine housing 100, wherein the turbine housing 100 comprises a feed duct assembly 200, a turbine outlet duct 110 and a receptacle space 120. The receptacle space 120 is fluidically connected to the feed duct assembly 200 and the turbine outlet duct 110. The turbine 10 comprises a turbine wheel 300. The turbine wheel 300 in the receptacle space 120 is disposed between the feed duct assembly 200 and the turbine outlet duct 110. The turbine 10 can in particular be a radial turbine. The turbine 10 moreover comprises a turbine rear wall 11 which on the bearing housing is coupled to the turbine housing 100. As can best be seen in FIG. 4, the turbine rear wall 11 can be configured as part of the bearing housing 40. In other design embodiments, the turbine rear wall 11 can also be separately provided and be connected to the turbine housing 100 and the bearing housing 40. With reference to FIG. 1, the charging device 1 furthermore comprises a shaft 30 which has a rotation axis X and is rotatably coupled to the turbine wheel 300. In particular, the turbine wheel 300 is connected in a rotationally fixed manner to the shaft 30. The shaft 30 is rotatably mounted in the bearing housing 40. The axial direction 22 here is defined in relation to the rotation axis X. As is shown in FIG. 1, the compressor 50 comprises a compressor housing 51 in which a compressor wheel 52 is disposed. The bearing housing 40 is coupled (or connected) to the turbine housing 11. The bearing housing is coupled (or connected) to the compressor housing 51. The compressor wheel 52, on an end of the shaft 30 that lies opposite the turbine wheel 300, is coupled in a rotationally fixed manner to the shaft 30. In other words, the turbine wheel 300 and the compressor wheel 52 at opposite ends of the shaft 30 are coupled in a rotationally fixed manner to the shaft 30. As is shown in FIG. 1, the turbine 10 comprises a guide installation 400. The guide installation 400 in the receptacle space 120 is disposed radially outside the turbine wheel 300 and circumferentially surrounds the turbine wheel 300. Specific design embodiments of the turbine 10 and of the guide installation 400 will be described in detail further below.

In addition to the guide installation 400, the turbine 10 (not shown in the FIGS.) can comprise an output adjustment device in the form of a waste gate flap WG which is provided so as to be able to close and open a waste gate of the turbine 10 if required. The waste gate flap WG here can be connected to the actuating installation 60 by way of one or a plurality of levers and/or a control bar.

In design embodiments, the charging device 2 can furthermore comprise an electric motor (not shown in the FIGS.) which can be disposed in a motor space in the bearing housing 40. The turbine wheel 300 and/or the compressor wheel 52 here can be coupled to the electric motor by way of the shaft 30. The electric motor can have a rotor and a stator, in particular wherein the rotor can be disposed on the shaft 30, and wherein the stator surrounds the rotor. A power electronics circuit for controlling the electric motor can furthermore be disposed in a receptacle space in the bearing housing 40. The electric motor can also comprise a generator mode.

Figure 3:
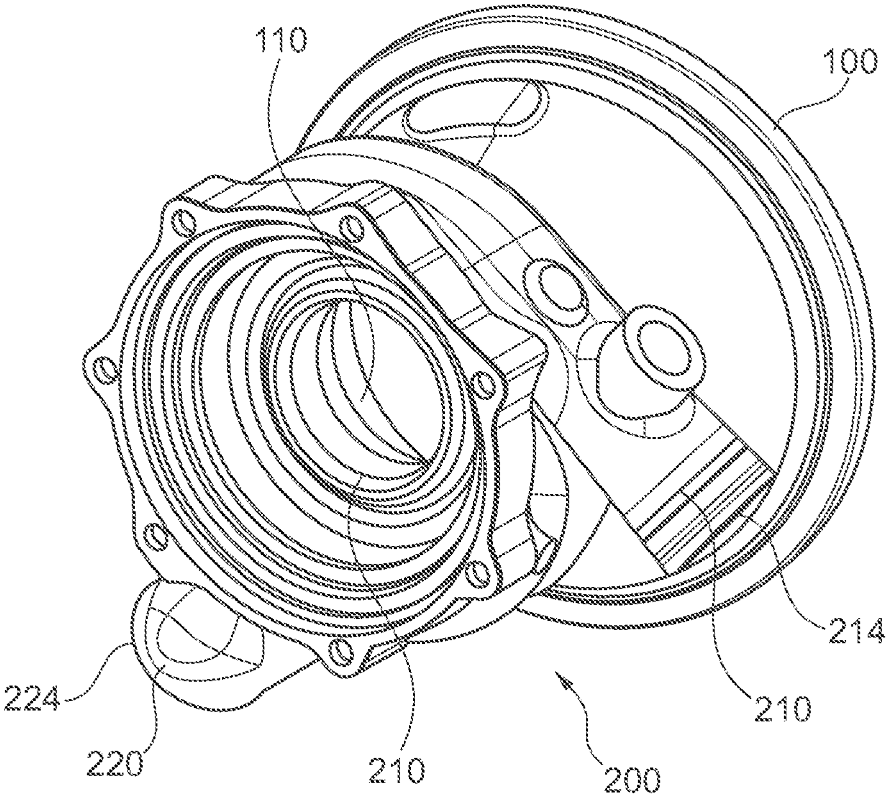
FIG. 3 shows a perspective view of a turbine housing of the turbine according to the invention.
Figure 6A:
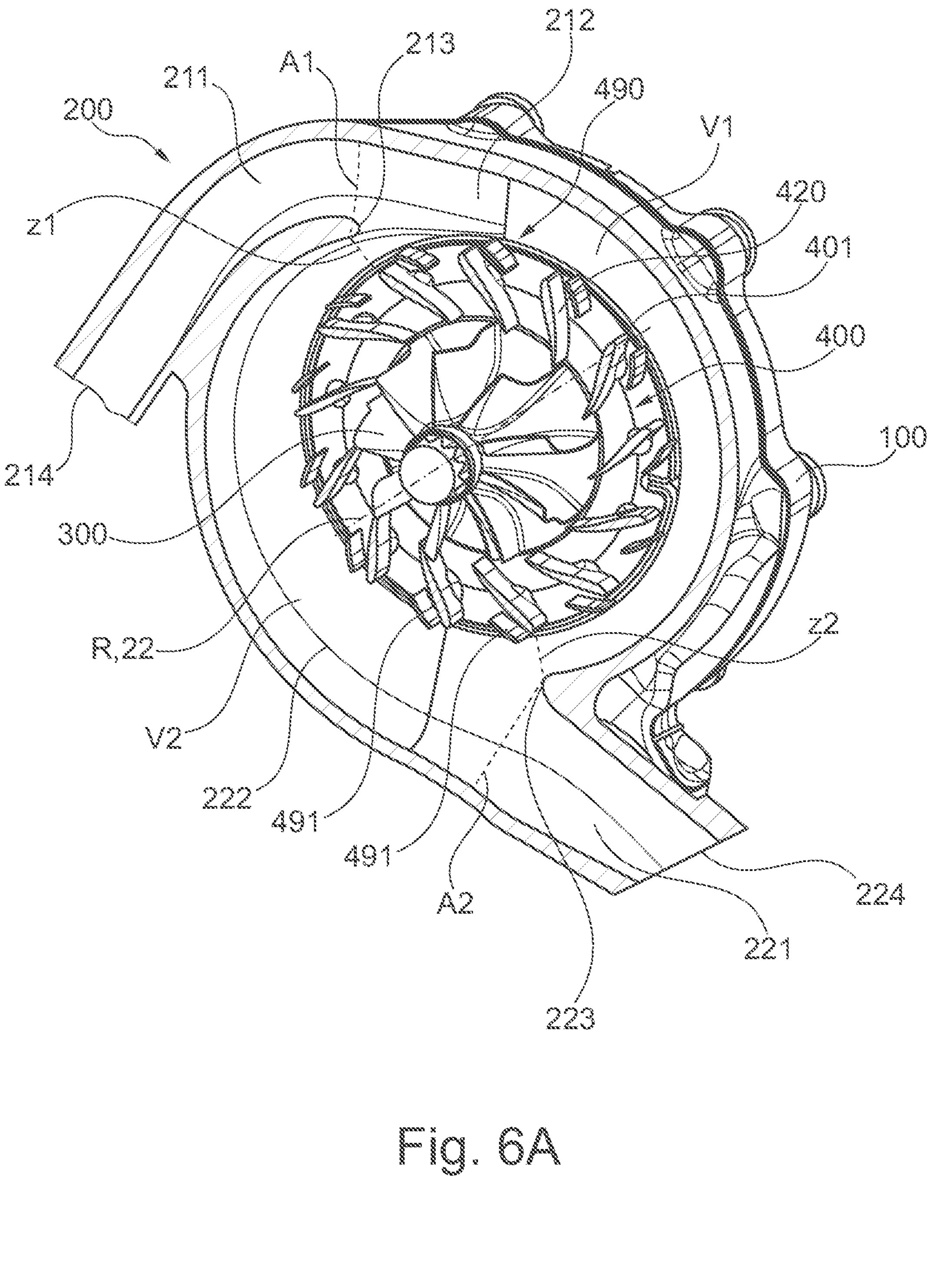
FIGS. 6A-6C show perspective views and a sectional view of the turbine according to the invention according to a first embodiment.
Figure 6B:
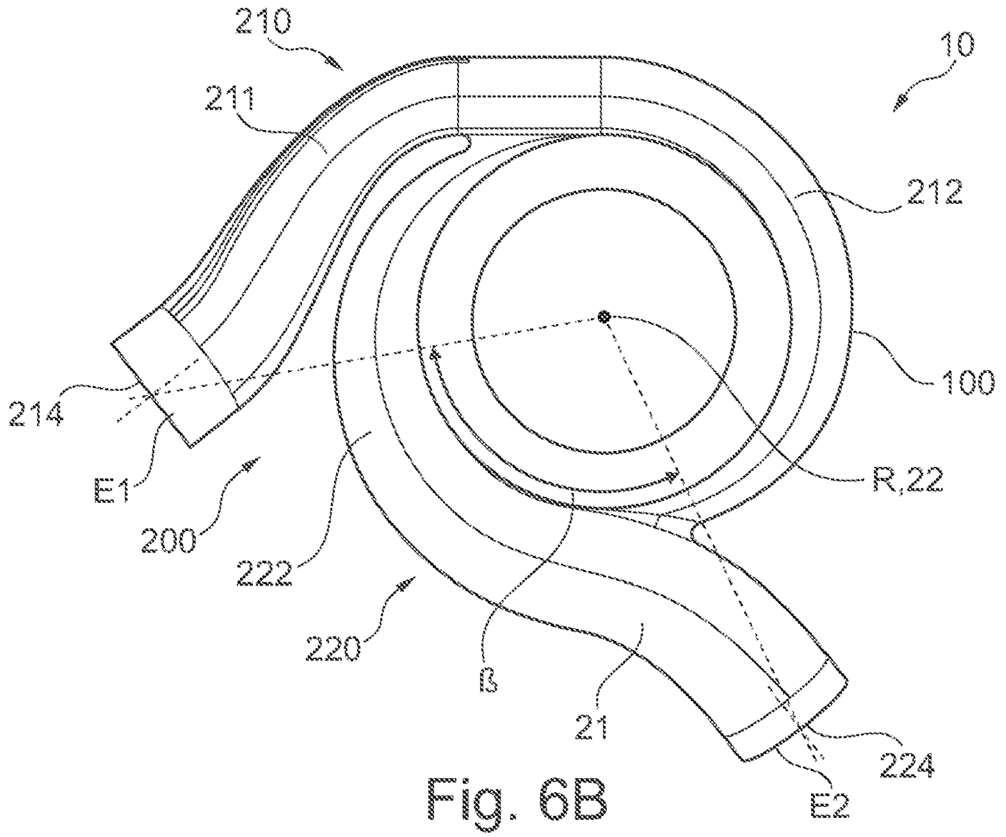
Figure 6C:
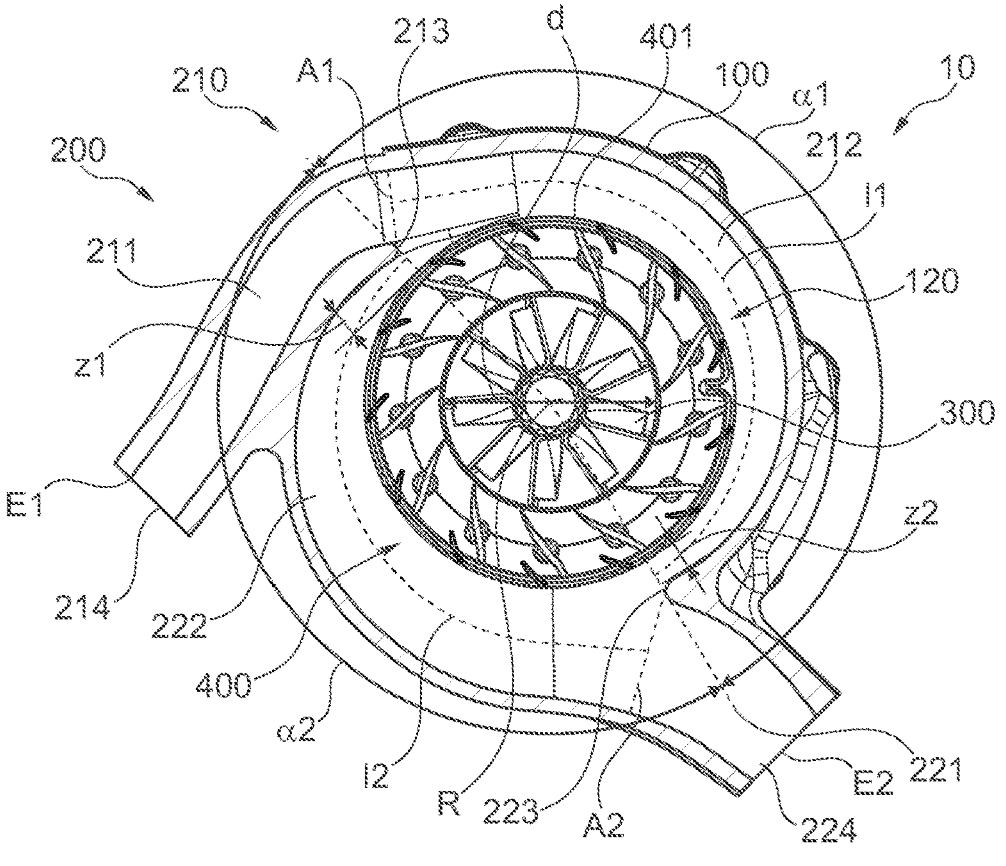
Figure 7A:
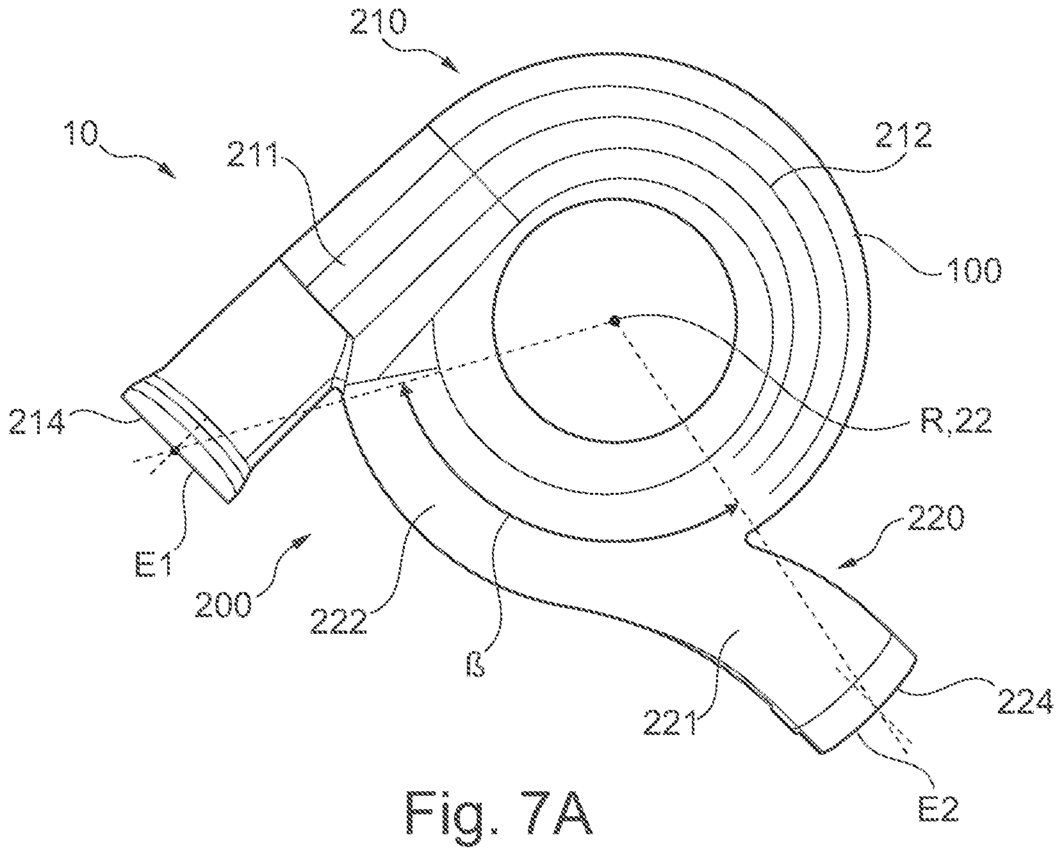
FIGS. 7A, 7B show a front view and a sectional view of the turbine according to the invention according to a second embodiment.
Figure 7B:
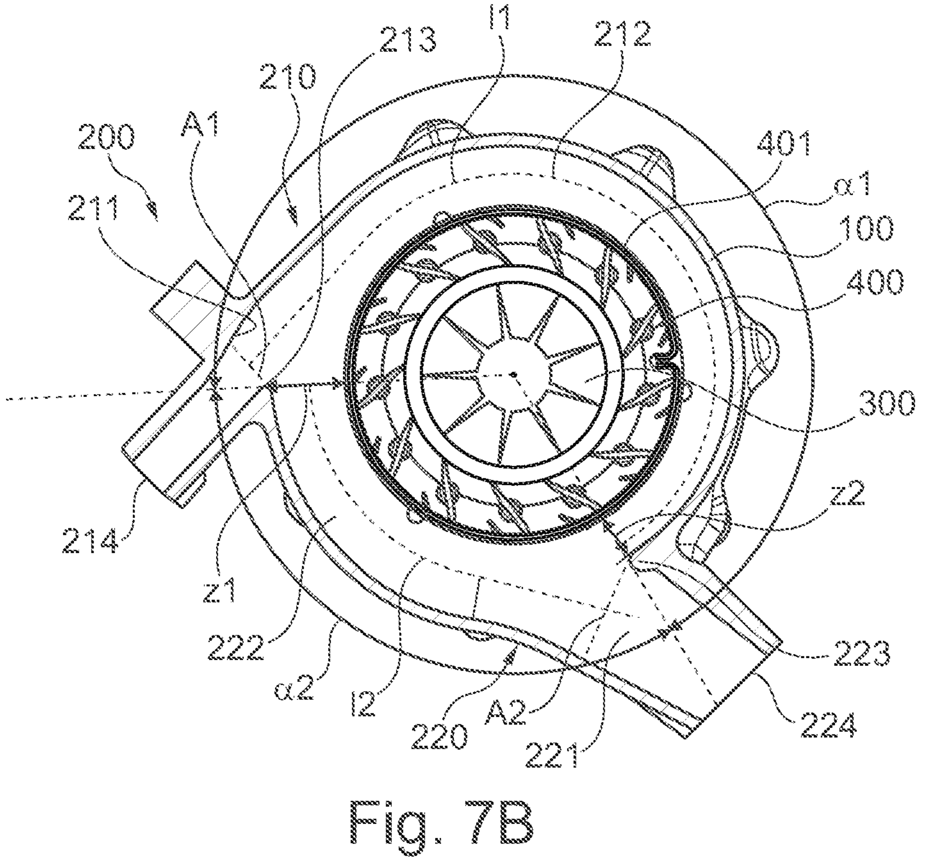

FIG. 3 shows a perspective view of the turbine housing 100 of the turbine 10 according to the invention. FIGS. 6A to 6C show perspective views and a sectional view of the turbine 10 according to the invention according to a first embodiment. FIGS. 7A and 7B show a front view and a sectional view of the turbine 10 according to the invention according to a second embodiment. The feed duct assembly 200 of the turbine housing 100 comprises a first feed duct 210 having a first fluid inlet portion 211 and a first fluid outlet portion 212. Moreover, the feed duct assembly 200 comprises a second feed duct 220 having a second fluid inlet portion 221 and a second fluid outlet portion 222. The first fluid outlet portion 212 extends across a first angular range $\alpha 1$ about the guide installation 400. The second fluid outlet portion 222 extends across a second angular range $\alpha 2$ about the guide installation 400 (see FIGS. 6C and 7B). The first angular range $\alpha 1$ here is larger than the second angular range $\alpha 2$. As can be seen in FIGS. 6A to 7B, the first fluid inlet portion 211 and the second fluid inlet portion 221 are moreover mutually spaced apart in the circumferential direction 26. In other words, the first fluid inlet portion 211 and the second fluid inlet portion 221 cannot be disposed so as to be mutually adjacent or mutually contiguous, respectively. The efficiency of the charging device 2, in particular of an exhaust gas turbocharger, can be increased by means of the turbine 10 according to the invention having this turbine housing 100 and the guide installation 400. Moreover, an improved separation of cylinder groups of a first cylinder group 4 and a second cylinder group 4 of an internal combustion engine 2 can be provided. Moreover, improved charge changing of an engine system 1 can be provided. In particular, as a result of the design embodiment of the turbine housing 100 according to the invention, having the feed duct assembly 200, a pressure level when exhausting the respective cylinders of a cylinder group 4, 5 can be reduced (i.e. downstream of the respective cylinders, in particular of the combustion chambers, of an internal combustion engine 3), and improved charge changing of the individual cylinders can be achieved. Moreover, mass flows of exhaust gas between the individual cylinder groups 4, 5 can be reduced. The charge changing can be provided more efficiently because a purging procedure, in particular the exhausting of exhaust gas from the cylinders (i.e. from the combustion chambers) can be improved as a result of the reduced pressure level, with less exhaust gas remaining in the respective cylinders (or combustion chambers, respectively), and subsequent combustion with fresh air therefore being able to be designed more efficiently. The engine system 1, the cylinder groups 4, 5, and the internal combustion engine 3 will be described in detail further below.

Moreover, emissions of incompletely combusted hydrocarbons can be reduced, this potentially leading to a more ecologically friendly operation of the turbine 10, of the charging device 2 and/or of the internal combustion engine 3. Moreover, an improved ignition point of the individual cylinders can be achieved, and an exhaust gas temperature upstream of the turbine wheel 300 can be reduced. As a result of the reduced exhaust gas temperature, a reduced thermal transfer to other components such as, for example, the bearing housing 40 and/or of the compressor housing 51 to which the turbine 10 can be coupled, can be provided. Moreover, ageing of the catalytic converter can be delayed by lowering a catalytic converter temperature at the nominal output of the internal combustion engine 3. As a result of the first fluid inlet portion 211 and the second fluid inlet portion 212 being mutually spaced apart in the circumferential direction 26, it is possible to provide a better link between the turbine 10 and the first cylinder group 4 and the second cylinder group 5. Moreover, the space (or the installation space) required for the charging device 2, in particular the turbine 10, in commercial vehicles and passenger vehicles can be reduced as a result.

As is shown in FIGS. 6A to 7B, the first feed duct 210 can define a first tongue end 213 between the first fluid inlet portion 211 and the first fluid outlet portion 212. Moreover, the second feed duct 220 can define a second tongue end 223 between the second fluid inlet portion 221 and the second fluid outlet portion 222. The respective tongue end 213, 223 can be defined as the location of the turbine housing 100 where the respective fluid inlet portion 211, 221 opens into the turbine housing 100, in particular into the receptacle space 120. The respective tongue end 213, 223 can be defined as the location of the turbine housing 100 where the respective fluid inlet portion 211, 221 transitions to the respective fluid outlet portion 212, 222. The respective tongue end 213, 223 here can be defined as the location of the respective fluid inlet portion 211, 221 that has a smallest duct cross section of the respective fluid inlet portion 211, 221, in particular before the fluid flows to the turbine wheel 300, or to an upstream guide installation 400, respectively. The first angular range $\alpha 1$ between the first tongue end 213 and the second tongue end 223 can be measured in relation to the rotation axis R of the turbine wheel 300. The second angular range $\alpha 2$ between the second tongue end 223 and the first tongue end 213 can be measured in relation to the rotation axis R of the turbine wheel 300. The first angular range $\alpha 1$ and the second angular range $\alpha 2$ here can in each case be defined in the rotating direction of the turbine wheel 300 (clockwise in the FIGS.). The first fluid outlet portion 212 and the second fluid outlet portion 222 can be of an asymmetric design. Asymmetric can mean that the respective fluid outlet portions 212, 222 are designed differently in terms of their shape, volume, width, height and/or length. Asymmetric can in particular mean that the respective angular ranges $\alpha 1$, $\alpha 2$, the tongue spacings z1, z2, the portion lengths 11, 12, the portion volumes V1, V2, and/or the duct cross-sectional areas A1, A2 of the first fluid outlet portion 212 and of the second fluid outlet portion 222 are designed differently. This can be provided in particular because the guide installation 400 can have an odd number of guide vanes. As a result of the asymmetric design, this odd number of guide vanes can be taken into account, an improved incident flow of the guide installation 400 and/or of the turbine wheel 300, and/or an improved separation of cylinder groups can be provided. Moreover, the turbine housing 100, the turbine 10 and/or the charging device 2 can be provided at low costs and with a small degree of complexity in terms of maintenance.

The first feed duct 210 can be able to be connected to a first cylinder group 4 of an internal combustion engine 3. The second feed duct 220 can be able to be connected to a second cylinder group 5 of the internal combustion engine 3. The first cylinder group 4 can in particular be disposed on a first bank of cylinders. The second cylinder group 5 can be disposed on a second bank of cylinders. This can be provided when the internal combustion engine 3 is provided in a V construction mode. In design embodiments, the first cylinder group 4 and the second cylinder group 5 can be disposed on one bank of cylinders, in particular a single bank of cylinders. This can be provided when the internal combustion engine 3 is provided as an inline engine. The first feed duct 210 or the second feed duct 220 here can be connected to the first cylinder group 4 by way of a cylindrical coupling element. The respective other first feed duct 210 or second feed duct 220 can have a flange by way of which the first feed duct 210 or the second feed duct 220 is able to be connected to the second cylinder group 5. The flange can be provided in particular in order to be able to provide assembling of the turbine 10 and/or of the charging device 2 on the internal combustion engine 3 (e.g. on a bank of cylinders).

As is illustrated in FIGS. 6A to 7B, the first fluid inlet portion 211 can have a first inlet 240, and the second fluid inlet portion 221 can have a second inlet 224. The first inlet 214 and the second inlet 224 in the circumferential direction 26 here can be mutually spaced apart by an inlet portion angle β. In particular, the inlet portion angle β can be more than 10°, more specifically more than in particular more than 45°. As is shown in the design embodiment in FIGS. 6B and 7A, the inlet portion angle β can also be more than 90°. As a result of the spacing in the circumferential direction 26, the turbine 10 can be better linked to the cylinder groups 4, 5 (or the bank of cylinders or the banks of cylinders), and an improved inflow or supply of exhaust gas to the turbine wheel 300 can be achieved. Moreover, a more compact disposal in the installation space can be enabled. Fluid (e.g. exhaust gas) can in each case flow into the first fluid inlet portion 211 or the second fluid inlet portion 221 at the first inlet 214 and at the second inlet 224, respectively. The inlet portion angle β in relation to the rotation axis R of the turbine wheel 300 here can be defined in the radial direction 24 between a respective centre of the first inlet 214 and of the second inlet 224. The first inlet 214 can define a first inlet cross section E1, and the second inlet 224 can define a second inlet cross section E2. The centre of the respective inlet 214, 224 here can be defined in relation to the first inlet cross section E1 and the second inlet cross section E2. A first plane, which is defined by the first inlet cross section E1, can be inclined and/or orthogonal in relation to a second plane, which is defined by the second inlet cross section E2. In other words, the first inlet 214, in particular the first inlet cross section E1, and the second inlet 224, in particular the second inlet cross section E2, can be disposed in different planes and/or disposed so as not to be mutually adjacent. Consequently, the first inlet 214, in particular the first inlet cross section E1, can be inclined and/or orthogonal in relation to the second inlet 224, in particular the second inlet cross section E2. In design embodiments, the first fluid inlet portion 211 and the second fluid inlet portion 221 can also be disposed in such a manner that the first inlet 214 is rotated by 180° in relation to the second inlet 224. In this case, the first and second planes may be disposed so as to be mutually parallel but the respective inlets 214, 224 are provided, or point, in opposite directions.

As is shown in FIGS. 6A, 6B, and 7B, a first tongue spacing z1 can be defined between an external circumference 401 of the guide installation 400 and the first tongue end 213. A second tongue spacing z2 can be defined between the external circumference 401 of the guide installation 400 and the second tongue end 223. The first tongue spacing 213 and the second tongue spacing 223 can in each case be measured in the radial direction 24 in relation to the rotation axis R of the turbine wheel 300. Consequently, the respective tongue spacing z1, z2 can be measured in the radial direction 24 in relation to the rotation axis R between the external circumference 401 of the guide installation 400 and an internal circumference of the respective fluid outlet 212, 222 on the respective tongue end 213, 223.

As can be seen in FIGS. 6C and 7B, the first fluid outlet portion 212 can have a first portion length 11. The second fluid outlet portion 222 can have a second portion length 12. The first portion length 11 between the first tongue end 213 and the second tongue end 223 can be measured along a central axis of the first fluid outlet portion 212. The second portion length 12 between the second tongue end 223 and the first tongue end 213 can be measured along a central axis of the second fluid outlet portion 222 (in particular when viewed in the clockwise direction). Moreover, the first fluid outlet portion 212 can have a first portion volume V1. The second fluid outlet portion 222 can have a second portion volume V2, in particular wherein the first portion volume V1 and the second portion volume V2 can in each case be defined between the first tongue end 213 and the second tongue end 223. The first feed duct 210 can have a first duct cross-sectional area A1. The second feed duct 220 can have a second duct cross-sectional area A2. In particular, the first duct cross-sectional area A1 on the first tongue end 213 can be smaller than the second duct cross-sectional area A2 on the second tongue end 223. The first fluid inlet portion 211 can extend between the first inlet 214, in particular the first inlet cross section E1 where the first fluid inlet portion 211 is able to be connected to the first cylinder group 4, and the first duct cross-sectional area A1 on the first tongue end 213. The second fluid inlet portion 221 can extend between the second inlet 224, in particular the second inlet cross section E2 where the second fluid inlet portion 221 is able to be connected to the second cylinder group 5, and the second duct cross-sectional area A2 on the second tongue end 223.

FIGS. 6A to 6C show the first embodiment of the turbine 10. In the first embodiment, the feed duct 210, in particular the first fluid outlet portion 212, can form a first volute. The second feed duct 210, in particular the second fluid outlet portion 222, can form a second volute. The first volute and the second volute here can be designed and disposed in such a manner that a fluid mass flow, or mixing of fluid, respectively, between the first fluid outlet portion 212 and the second fluid outlet portion 222 is impeded upstream of the guide installation 400. The reduced or impeded mixing of fluid, respectively, can in particular be provided by a reduction of the tongue spacings z1, z2 between the guide installation 400 and the respective tongue ends 213, 223. Apart from an improved separation of cylinder groups, an improved fluid flow to the turbine wheel 300 can be provided as a result, in particular because the fluid (in particular exhaust gas) can be guided to the turbine wheel 300 by the shape of the volute. In this embodiment, the first fluid outlet portion 212 and the second fluid outlet portion 222 can be of a spiral-shaped design. In other words, the respective volute can also be referred to as a turbine housing spiral. Spiral-shaped can mean that the first duct cross-sectional area A1 tapers from the first tongue end 213 towards the second tongue end 223. The second duct cross-sectional area A2 can taper from the second tongue end 223 towards the first tongue end 213. In design embodiments, the first duct cross-sectional area A1 and/or the second duct cross-sectional area A2 can taper continuously. In other design embodiments, the first duct cross-sectional area A1 and/or the second duct cross-sectional area A2 can also be provided so as to be constant in portions.

In the first embodiment of the turbine 10 according to FIGS. 6A to 6C, the first angular range α1 can be between 181° and 250°, in particular between 185° and 220°. The second angular range α2 can be between 110° and 179°, in particular between 140° and 175°. The two angular ranges α1, α2 when added can result in 360°. The first tongue spacing z1 can be smaller than the second tongue spacing z2. In particular, a ratio of the first tongue spacing z1 to the second tongue spacing z2 can be between 0.80 and 1.00, preferably between 0.85 and 0.98. In design embodiments, a ratio of the first tongue spacing z1 to a diameter d of the turbine wheel 300 can be between 0.05 and 0.25, in particular between 0.10 and 0.18. As a result of the small degree of tongue spacing z1, an improved separation of cylinder groups (or separation of banks of cylinders, respectively), a reduced exchange of fluid mass between the volutes, or the cylinder groups 4, 5, respectively, and/or a lower pressure level downstream of the combustion chambers can be provided such that a purging procedure can be facilitated. The diameter of the turbine wheel d can be between 30 mm and 90 mm, in particular between 35 mm and 85 mm. A ratio of the second tongue spacing z2 to a diameter d of the turbine wheel 300 can be between 0.06 and 0.28, in particular between 0.12 and 0.20. The first portion length 11 can be larger than the second portion length 12. A ratio of the first portion length 11 to the second portion length 12 can be between 1.02 and 1.3, in particular between 1.05 and 1.20. The first portion volume V1 can be smaller than the second portion volume V2. In particular, a ratio of the first portion volume V1 to the second portion volume V2 can be between 0.70 and 0.98, preferably between 0.85 and 0.95. The above-described advantages of the turbine 10 can be provided by means of these features.

FIGS. 7A and 7B show the second embodiment of the turbine 10. In this embodiment, the first fluid outlet portion 212 and the second fluid outlet portion 222 can form a common volute. A mono-volute can in particular be provided as a result. The common volute can circumferentially surround the guide installation 400 and be designed in such a manner that a fluid mass flow between the first fluid outlet portion 212 and the second fluid outlet portion 222 can take place upstream of the guide installation 400. Mixing of fluid can in particular take place between the fluid outlet portions 212, 222. The mixing of fluid, in particular upstream of the guide installation 400, can take place as a result of an enlarged tongue spacing z1, z2 between the guide installation 400 and the respective tongue ends 213, 223. The above-described advantages of the turbine 10 can be provided by this second embodiment despite a mixing of fluid between the fluid outlet portions 212, 222 being able to take place upstream of the guide installation 400, as corresponding experiments and simulations have demonstrated in particular. Moreover, a better incident flow of the turbine wheel 300 and/or of the guide installation 400 can be provided, because a smaller circumferential region of the turbine wheel 300 and/or of the guide installation 400 is shielded or covered by the respective tongue ends 213, 223. In this second embodiment of the turbine 10, the first fluid outlet portion 212 can be of a spiral-shaped design. In particular, the first duct cross-sectional area A1 can decrease or taper from the first tongue end 213 towards the second tongue end 223, respectively. The second duct cross-sectional area A2 in a predominant region of the second fluid outlet portion 222 between the second tongue end 223 and the first tongue end 213 can be almost constant. The "predominant region" here refers to a respective portion length 11, 12.

With reference to the second embodiment of the turbine 10 illustrated in FIGS. 7A and 7B, the first angular range $\alpha$1 can be between 200° and 280°, in particular between 220° and 260°. The second angular range $\alpha$2 can be between 80° and 160°, in particular between 100° and 140°. The two angular ranges a1, a2 when added can result in 360° here. The first tongue spacing z1 can be larger than the second tongue spacing z2. A ratio of the first tongue spacing z1 to the second tongue spacing z2 can be between 1.20 and 1.90, in particular between 1.50 and 1.70. A ratio of the first tongue spacing z1 to a diameter d of the turbine wheel 300 can be between 0.25 and 0.50, in particular between 0.35 and 0.45. The diameter d of the turbine wheel can be between 30 mm and mm, in particular between 35 mm and 85 mm. A ratio of the second tongue spacing z2 to the diameter d of the turbine wheel 300 can be between 0.15 and 0.40, in particular between 0.20 and 0.30. In design embodiments, the first portion length 11 can be larger than the second portion length 12. A ratio of the first portion length 11 to the second portion length 12 can be between 2.20 and 3.00, in particular between 2.50 and 2.75. The first portion volume V1 can be larger than the second portion volume V2. A ratio of the first portion volume V1 to the second portion volume V2 can be between 1.70 and 2.50, in particular between 2.05 and 2.25. The above-described advantages of the turbine 10 can be provided by means of these features.

Figure 2:
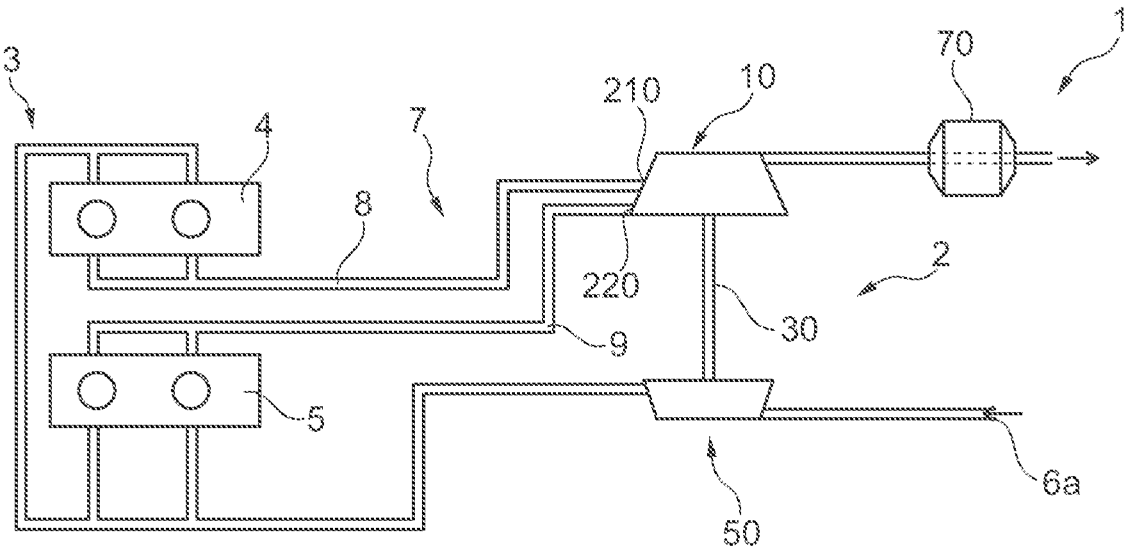
FIG. 2 shows a schematic view of an engine system having the charging device from FIG. 1.

FIG. 2 shows a schematic view of an engine system 1 having the charging device 2 from FIG. 1, which has the turbine 10 according to the invention. The engine system 1 comprises an internal combustion engine 3. The internal combustion engine has a first cylinder group 4 and a second cylinder group 5. Moreover, the internal combustion engine 1 has a plurality of cylinders. In particular, the first cylinder group 4 can be disposed on a first bank of cylinders. The second cylinder group 5 can be disposed on a second bank of cylinders. In design embodiments, the first cylinder group 4 and the second cylinder group 5 can be disposed on one bank of cylinders, in particular on a common bank of cylinders. Two banks of cylinders can be used in particular in internal combustion engines of the V construction mode. V construction mode means that the banks of cylinders are mutually disposed in a V-shape. The charging device 2 can be disposed between the two banks of cylinders. If the internal combustion engine 3 is configured as an in-line engine, the first cylinder group 4 and the second cylinder group 5 can be disposed on a single bank of cylinders. The designation "inline engine" means that all cylinders are disposed in one row on one bank of cylinders. In design embodiments, a plurality of cylinders can form the first cylinder group 4. In design embodiments, a plurality of cylinders can form the second cylinder group 5. Even while two cylinders are shown as the first cylinder group 4 (in particular on a first bank of cylinders), and two cylinders are shown as the second cylinder group 5 (in particular on a second bank of cylinders) in FIG. 2, only one cylinder per cylinder group 4, 5, or per bank of cylinders, may also be provided. In other design embodiments, more than two cylinders, for example three cylinders or four cylinders, can in each case also form the first cylinder group 4 and/or the second cylinder group 5, which are in each case disposed on one bank of cylinders or conjointly on one bank of cylinders. In design embodiments, the first cylinder group 4 and the second cylinder group can in each case have a plurality of cylinders having in each case one combustion chamber (or combustion space, respectively). The combustion chamber or the combustion space is the space which is adjacent to a piston and into which an air/fuel mixture is introduced, ignited and combusted therein. As has already been described, the engine system 1 moreover has the charging device 2 having the turbine 10 according to the invention. The turbine 10 is disposed downstream of the internal combustion engine 1 and is fluidically connected to the first and the second cylinder group 4, 5, in particular to the cylinders. In particular, the first feed duct 210 of the turbine 10, downstream of the internal combustion engine 1, is fluidically connected to the first cylinder group 4. The second feed duct 220, downstream of the internal combustion engine 1, is fluidically connected to the second cylinder group 5. An efficiency of the internal combustion engine 1, of the charging device 2 and/or of the turbine 10 can be increased by means of the engine system 1 according to the invention. Moreover, an improved separation of cylinder groups (or separation of cylinder banks) of the internal combustion engine 3 can be provided. Moreover, improved charge changing of the internal combustion engine 3 in the engine system 1 can be provided. As a result of the design embodiment according to the invention of the turbine 10 having the feed duct assembly 200, a pressure level when exhausting the respective cylinders of a cylinder group 4, 5 (i.e. downstream of the respective cylinders, in particular the combustion chambers) can moreover be reduced, and improved charge changing of the individual cylinders can be achieved. Moreover, mass flows of exhaust gas between the individual cylinder groups 4, 5 can be reduced. The charge changing can be provided more efficiently because a purging procedure, in particular the exhausting of exhaust gas from the cylinders (i.e. from the combustion chambers) can be improved as a result of the reduced pressure level, with less exhaust gas remaining in the respective cylinders and subsequent combustion with fresh air therefore being able to be designed more efficiently. Moreover, emissions of incompletely combusted hydrocarbons can be reduced, this potentially leading to a more ecological friendly operation of the turbine 10, of the charging device 2, of the internal combustion engine 3 and/or of the engine system 1. Moreover, an improved ignition point of the individual cylinders can be achieved, and an exhaust gas temperature upstream of the turbine wheel 300 can be reduced. As a result of the reduced exhaust gas temperature, a reduced thermal transfer to other components such as, for example, the bearing housing 40 and/or the compressor housing 50 to which the turbine 10 can be coupled, can be provided. Moreover, aging of the catalytic converter can be delayed by lowering a catalytic converter temperature at the nominal output of the internal combustion engine 3. As a result of the first fluid inlet portion 211 and the second fluid inlet portion 221 being mutually spaced apart in the circumferential direction 26, it is possible to provide a better link between the turbine 10 and the first and the second cylinder group 4, 5. As a result of the improved and more efficient operation of the turbine 10, an improved and more efficient compression of fluid (e.g. fresh air) by the compressor 50 can moreover be provided, and an efficiency of the internal combustion engine 3 can be improved as a result. Moreover, the engine system 1 can be provided at lower costs and with a low degree of complexity in terms of maintenance.

The compressor 50 can be disposed upstream of the internal combustion engine 1 and likewise be fluidically connected to the first and the second cylinder group 4, 5, in particular to the cylinders. A charge-air cooler (not shown in the FIGS.) can be disposed between the compressor 50 and the internal combustion engine 1. Compressed fluid can be cooled by the charge-air cooler. An exhaust gas treatment 70, in particular a catalytic converter, can be disposed downstream of the turbine 10.

An exhaust gas throttle valve (not shown) can be provided downstream of the catalytic converter 70. Moreover, an exhaust gas recirculation can be provided (also not shown).

As is shown in FIG. 2, the engine system 1 can comprise an inlet duct 6 which is disposed upstream of the internal combustion engine 3 and is fluidically connected to the respective combustion chambers, in particular to the respective combustion chambers of the first cylinder group 4 and of the second cylinder group 5, so as to feed fluid, in particular inlet air, to the combustion chambers. Furthermore, the engine system 1 can comprise an outlet duct 7 which is disposed downstream of the internal combustion engine 3 and is connected to the respective combustion chambers, in particular to the respective combustion chambers of the first cylinder group 4 and of the second cylinder group 5, so as to discharge fluid, in particular exhaust gas, from the combustion chambers. The inlet air can in particular be ambient air, for example at atmospheric pressure. The inlet duct can have an atmosphere-proximal inlet 6*a*. As is shown in FIG. 2, the outlet duct 7 can have a first outlet sub-duct 8 which is fluidically connected to the combustion chambers of the first cylinder group 4. Moreover, the outlet duct 7 can have a second outlet sub-duct 9 which is fluidically connected to the combustion chambers of the second cylinder group 5. The turbine 10 can in particular be disposed in the outlet duct 7. The first feed duct 210 here can be fluidically connected to the first outlet sub-duct 8. The second feed duct 220 can be fluidically connected to the second outlet sub-duct 9. The compressor 50 can be disposed in the air inlet duct 6.

The engine system 1 can moreover comprise a first lambda probe and a second lambda probe (not shown in the FIGS.). The first lambda probe can be disposed downstream of the first cylinder group 4, in particular in the first outlet sub-duct 8. The second lambda probe can be disposed downstream of the second cylinder group 5, in particular in the second outlet sub-duct 9. An improved separation of cylinder groups (or in the case of the V construction mode an improved separation of cylinder banks, respectively) can be provided by means of the turbine 10 according to the invention. A combustion air ratio in the respective first and second cylinder group 4, 5 can be determined by means of the first and the second lambda probes, said combustion air ratio in particular specifying a ratio of combustion air to fuel that is supplied to the inlet air in the combustion chamber. The combustion air ratio for the respective cylinder group 4, 5 can be determined by means of the measurements (e.g. whether a rich, balanced or lean combustion takes place) and correspondingly adjusted. The lambda probes can in particular compare a residual oxygen content in the exhaust gas with a reference oxygen content, for example of the air of the atmosphere. By means of the measurements and of the corresponding adjustment of the combustion air ratio (e.g. the fuel mixture generation and/or the injected fuel quantity into the respective combustion chambers), emissions can be reduced and a catalytic exhaust gas treatment can be improved. As a result of the separation of cylinder groups, better control of the internal combustion engine 3 and/or the engine system 1 can be provided by means of the turbine 10 and the disposal of the lambda probes. This can be particularly reliably provided in combination with the first embodiment of the turbine 10 (see above), because less mixing of fluid arises here by virtue of small tongue spacings z1, z2 between the first feed duct 210 and the second feed duct 220.

Figure 5A:
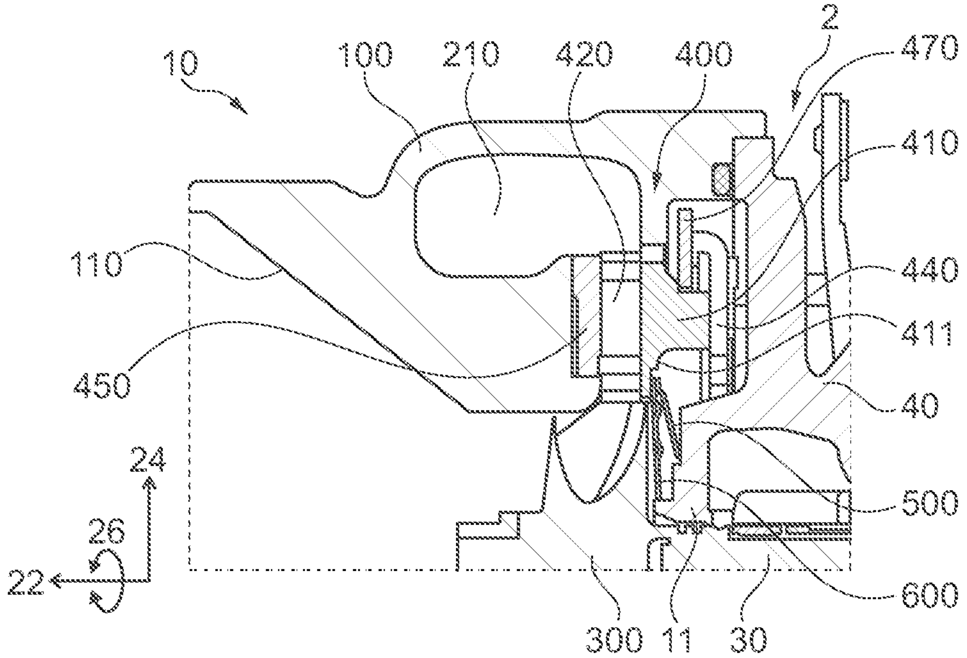
FIGS. 5A, 5B show a detailed sectional view of the turbine according to the invention from FIG. 4.
Figure 5B:
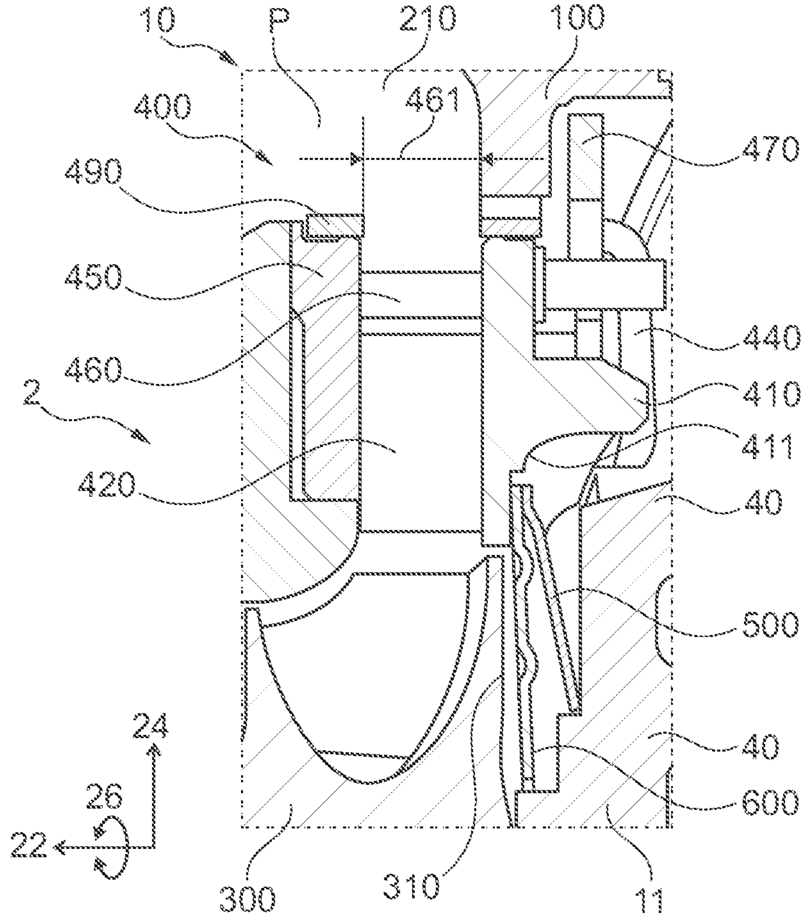
Figure 8B:
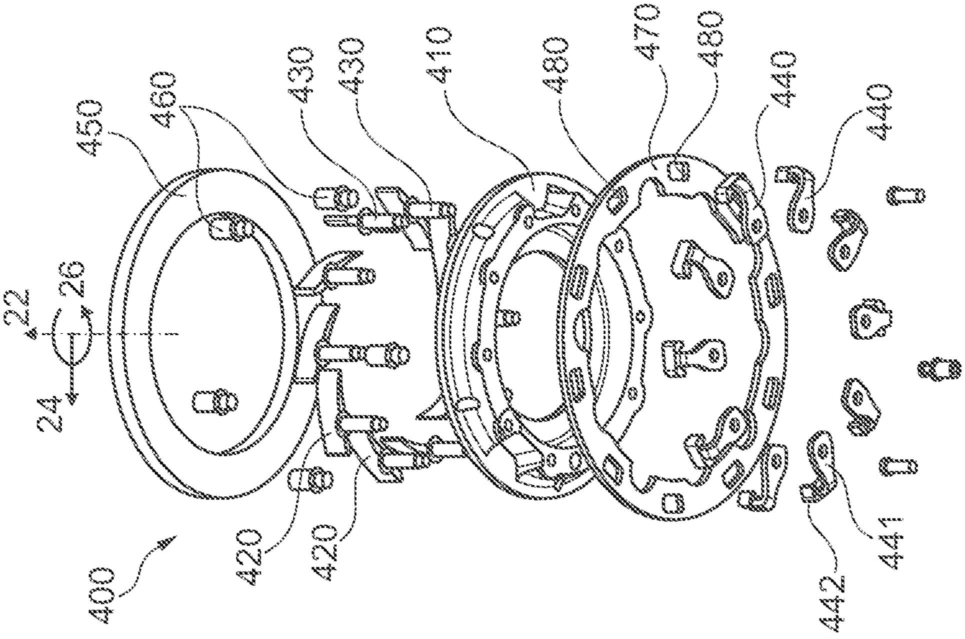
FIGS. 8A, 8B show a perspective view and an exploded view of a guide installation which has adjustable guide vanes and is mounted in the turbine according to the invention.
Figure 8A:
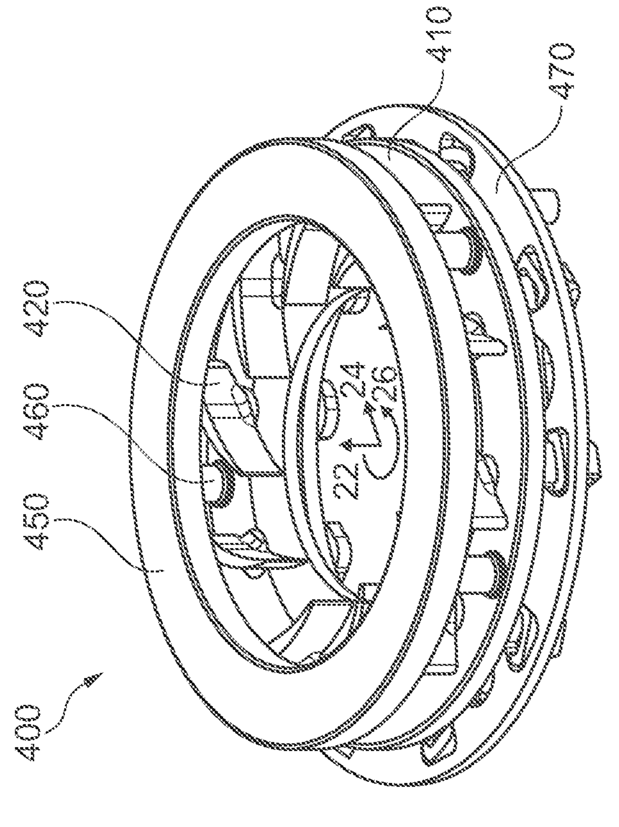

FIGS. 6A, 8A and 8B show perspective views and an exploded view of a guide installation 400 for the turbine 10 according to the invention. FIGS. 5A and 5B show more detailed sectional views of the turbine 10, in which the guide installation 400 is also illustrated as a sectional view. The guide installation 400 is provided for varying an inflow to the turbine wheel 300. The guide installation 400 is disposed radially outside the turbine wheel 300, in particular wherein the guide installation 400 circumferentially surrounds the turbine wheel 300. The guide installation 400 is in particular disposed between the feed duct assembly 200 and the turbine wheel 300. The guide installation 400 here can be provided as a cartridge which can be assembled in the turbine housing 100. The guide installation 400 can in particular be pre-assembled as a cartridge and, by way of at least three pins, which are uniformly spaced apart in the circumferential direction 26, be assembled on the turbine housing rear wall 11, in particular on the bearing housing 40.

As is shown in FIGS. 4 to 5B, 8A and 8B, the guide installation 400 comprises a carrier ring 410. In one design embodiment, the guide installation 400 can comprise a plurality of adjustable guide vanes 420 which are rotatably mounted in the carrier ring 410 (as shown in the FIGS.). This guide installation 400 can also be referred to as a variable turbine geometry (VTG). In another design embodiment, the guide installation 400 can comprise a plurality of fixed guide vanes, wherein the fixed guide vanes are fixedly disposed in a predetermined orientation on the carrier ring 410 (not shown in the FIGS.). In other words, the fixed guide vanes in this design embodiment are fastened to the carrier ring 410 so as not to be adjustable, in particular not rotatable. Consequently, these guide vanes have a fixed angle of attack. This guide installation 400 can also be referred to as a fixed blade geometry. Combinations of both design embodiments are also possible: for example, the guide installation 400 can have a plurality of adjustable guide vanes 420 and a plurality of fixed guide vanes (likewise not shown in the FIGS.). In one design embodiment, the adjustable guide vanes 420 can be disposed (in particular in the circumferential direction 26) in the region of the first fluid outlet portion 212, or in the region of the second fluid outlet portion 222. The fixed guide vanes can be disposed in the region of the respective other first fluid outlet portion 212 or second fluid outlet portion 222.

In design embodiments, the plurality of adjustable guide vanes 420 and/or the plurality of fixed guide vanes can be disposed between the feed duct assembly 200 and the turbine wheel 300 and circumferentially surround the turbine wheel 300. In particular, fluid from the feed duct assembly 200 can be directed onto the turbine wheel 300 by way of the plurality of adjustable guide vanes 420 and/or by way of the plurality of fixed guide vanes during operation. The plurality of adjustable guide vanes 420 and/or the plurality of fixed guide vanes can be uniformly mutually spaced apart in the circumferential direction 26. An odd number of guide vanes can be provided. More than eight guide vanes, in particular more than ten guide vanes, preferably more than 12 guide vanes can be provided. In one design embodiment, 13 guide vanes can be provided. In other design embodiments, an even number of guide vanes 120 can be provided.

A guide installation 400 having a plurality of adjustable guide vanes 420 will be described hereunder with reference to FIGS. 4 to 5B, 8A and 8B. The adjustable guide vanes 420 can be adjusted between a first position, in particular a first terminal position, and a second position, in particular a second terminal position. A plurality of intermediate positions can be adjusted between the first and the second position. The first position corresponds to a position of the guide installation 400 opened to the maximum. The second position corresponds to a position of the guide installation 400 opened to the minimum. As a result, a fluid flow from the feed duct assembly 200 can be variably directed to the turbine wheel 300 by way of a flow duct, thus where the adjustable guide vanes 420 are disposed. Nozzle cross sections (also referred to as intermediate duct), which may be larger or smaller depending on the current position of the adjustable guide vanes 420 and correspondingly impinge the turbine wheel 300 mounted on the rotation axis R with more or less fluid of an internal combustion engine (e.g. exhaust gas) or of a fuel cell, so as to drive a compressor wheel 52 that sits on the same shaft 30, by way of the turbine wheel 300. The adjustable guide vanes 420 each have a leading edge and a trailing edge. Between the leading edge and the trailing edge, the adjustable guide vanes 420 have in each case a blade length. The blade length can be understood to be the distance between the leading edge and the trailing edge. The leading edge can be understood to be an incident flow region of the guide vane with a maximum distance from the vane axis. The trailing edge can be understood to be an outflow region of the adjustable guide vane with a maximum distance from the vane axis. In other words, the trailing edge, when viewed in the flow direction along the guide vane, is located downstream of the leading edge. A position of the adjustable guide vanes 420 can also be referred to as a position or operating position, or operational position, respectively. This enables any possible position of an adjustable guide vane 420 during the operation of the turbine 10 between the first position, at the maximum throughput/flow cross section (thus open to the maximum), and the second position, at the minimum throughput/flow cross section (thus open to the minimum, or closed to the maximum, respectively). Any "possible position" can be understood to be the positions that may be provided during operation. It is known to the person skilled in the art that the operating positions change variably and automatically during the operation of the turbine 10.

In order for the movement, or the position, of the adjustable guide vanes 420 to be controlled, the above-described actuating installation 60, which per se can be of an arbitrary configuration, for example electronic or pneumatic to mention only a few examples, can be provided. Consequently, the actuating installation 60 can be an electronic or pneumatic actuator. In the example of FIG. 1, the actuating installation 60 is configured so as to be pneumatic, having a control housing (for example a pressure cell) and a tappet element which can transmit the movement of the control housing (in particular of the tappet element) to the guide installation 400, or the adjustable guide vanes 420, by way of one or a plurality of levers and/or a control bar, in particular by way of an adjustment shaft assembly.

As is likewise shown in FIGS. 4 to 5B, 8A and 8B, the guide installation 400 having adjustable guide vanes 420 comprises an adjustment ring 470. The plurality of adjustable guide vanes 420 here are adjustable between the first position and the second position by means of a movement of the adjustment ring 470 in the circumferential direction 26. The actuating installation 60 is in particular operatively coupled to the adjustment ring 470 and is conceived for moving the adjustment ring 470 in the circumferential direction 26. The actuating installation 60 can be coupled to the adjustment ring 470 by way of one or a plurality of levers and/or a control bar. The plurality of adjustable guide vanes 420 are in each case rotatably mounted in the carrier ring 410 by way of a vane shaft 430. The carrier ring 410 can also be referred to as a vane bearing ring. In other words, the adjustable guide vanes 420 are rotatably mounted in the carrier ring 410 and can be rotated or adjusted by way of the adjustment ring 470, respectively. In particular, the adjustable guide vanes 420 can be rotatably mounted in the carrier ring 410 by way of the vane shafts 430 so as to be uniformly distributed in the circumferential direction 26. The vane shafts 430 here extend in the axial direction 22, thus parallel to the rotation axis R. In other words, the adjustable guide vanes 420 are rotatably mounted in the carrier ring 410 along a respective vane axis. An odd number of adjustable guide vanes 420 can be provided. More than eight adjustable guide vanes, in particular more than ten adjustable guide vanes, preferably more than 12 adjustable guide vanes can be provided. In one design embodiment, 13 adjustable guide vanes can be provided. However, in other design embodiments, an even number of adjustable guide vanes 420 can also be provided.

Each adjustable guide vane 420 of the plurality of adjustable guide vanes 420 is in each case connected in a rotationally fixed manner to one vane lever 440. Each vane lever 440 is in each case at least partially received in a coupling region 480 of the adjustment ring 480 for adjusting the respective adjustable guide vane 120. In other words, the vane levers 440 can be operatively coupled to the adjustment ring 470. The adjustable guide vanes 420 can be adjusted in a rotation of the adjustment ring 470 in the circumferential direction 26. The adjustable guide vanes 420 are in each case connected in a rotationally fixed manner to the vane shaft 130 on a first end of the vane shaft 430. The vane lever 140 is connected to the vane shaft 430 on a second end of the vane shaft 430 that lies opposite the first end. In design embodiments, the respective adjustable guide vane 420 can be configured so as to be integral to the vane shaft 430. Each vane lever 440 can have a radial vane lever portion 441 which extends radially from the vane shaft 430. Moreover, each vane lever 440 can have an axial vane lever portion 442 which extends axially towards the adjustment ring 470 from the radial vane lever portion 441 (see FIGS. 8A and 8B). In particular, the axial vane lever portion 442 can extend axially at least partially into the respective coupling region 480. The axial vane lever portion 442 can extend from the radial vane lever portion 441 here so as to be predominantly parallel to the vane shaft 430.

As is shown in FIGS. 4 to 5B, 8A and 8B, for example, the guide installation 400 can comprise a cover disc 450 which is disposed so as to be parallel to the carrier ring 410. The plurality of adjustable guide vanes 420 can be disposed between the cover disc 450 and the carrier ring 410. The cover disc 450 can also be provided when the guide installation 400, alternatively or additionally, has the fixed guide vanes. Alternatively, however, the cover disc 450 may also not be provided.

The guide installation 400 can moreover comprise a plurality of spacer elements 460 which are disposed on the carrier ring 410 so as to be distributed in the circumferential direction 26 in such a manner that said spacer elements 460 can define an axial spacing 461 of the carrier ring 410 from the cover disc 450 (see FIG. 5B). In particular, the plurality of spacer elements 460 can comprise at least three spacer elements 460. In design embodiments, the cover disc 450 may also not be provided and the plurality of spacer elements 460 can define an axial spacing 461 from a portion in the turbine housing 100 that lies axially opposite the carrier ring 410. A minimum clearance for the adjustment of the adjustable guide vanes 420 can be ensured by the spacer elements 460.

As is shown in FIGS. 5B and 6A, the guide installation 400, in particular having the plurality of adjustable guide vanes 420, can furthermore comprise an upstream guide grid 490 which circumferentially surrounds the carrier ring 410 and/or the plurality of adjustable guide vanes 420. The upstream guide grid 490 can have a plurality of fixed, flow-optimized spacer members 491. The fixed, flow-optimized spacer members 491 can in each case be disposed between two adjacent adjustable guide vanes 420, in particular adjacent to an external circumference 401 of the guide installation 400. In design embodiments, the spacer members 491 can be disposed on the external circumference 401 or within the external circumference 401. The fixed, flow-optimized spacer members 491 here are provided with a fixed angle of attack. In other words, the fixed, flow-optimized spacer members 491 are not rotatable or not adjustable, respectively. The upstream guide grid 490 here can replace the above-described spacer elements 460 and ensure the axial spacing 461 between the carrier ring 410 and the cover disc 450 (or a portion of the turbine housing 100). A minimum clearance for the adjustment of the adjustable guide vanes 420 can be ensured by the spacer members 491. As a result of the upstream guide grid 490, in particular as a result of the flow-optimized spacer members 491, an improved incident flow of the adjustable guide vanes 420 and/or of the turbine wheel 300 can be provided.

As has already been described above, the guide installation 400, in particular having the plurality of adjustable guide vanes 420, has an adjustment ring 470. The adjustment ring 470 comprises a plurality of coupling regions 480 which are configured in the adjustment ring 470. The coupling regions 480 can be spaced apart, in particular uniformly, in the circumferential direction 26 (see FIG. 8B). Each coupling region 480 is conceived for at least partially receiving a vane lever 440 for adjusting an adjustable guide vane 420 of the guide installation 400. Each vane lever 440 can in each case be at least partially received in a coupling region 420 for adjusting the respective adjustable guide vane 420. In other words, the respective vane levers 440 engage in each case with a coupling region 480 such that, when the adjustment ring 470 moves, in particular in the circumferential direction 26, this movement can be transmitted to the vane lever 440 and thus to the adjustable guide vanes 420. In particular, a rotation of the adjustment ring 470 in the circumferential direction 26 leads to a rotation of the respective adjustable guide vanes 420 about the respective vane axis thereof, and in particular to an adjustment of the respective adjustable guide vanes 420 between the first position and the second position. The vane levers 440 being "partially received", as described above, can mean that the respective vane lever 440 in the respective coupling region 480 extends, in particular in the axial direction 22, in such a manner that a transmission of force between the adjustment ring 470 and the vane levers 440 can take place when the adjustment ring 470 moves in the circumferential direction 26. As is shown in FIG. 8B, each coupling region 480 of the plurality of coupling regions 480 can be configured as a passage in the adjustment ring 470, said passage extending, in particular in the axial direction 22, between two mutually opposite lateral faces of the adjustment ring 470. As is shown in FIGS. 5A, 5B, 8A and 8B, the vane levers 440 and the adjustable guide vanes 420 can be disposed on opposite sides of the carrier ring 410.

Figure 4:
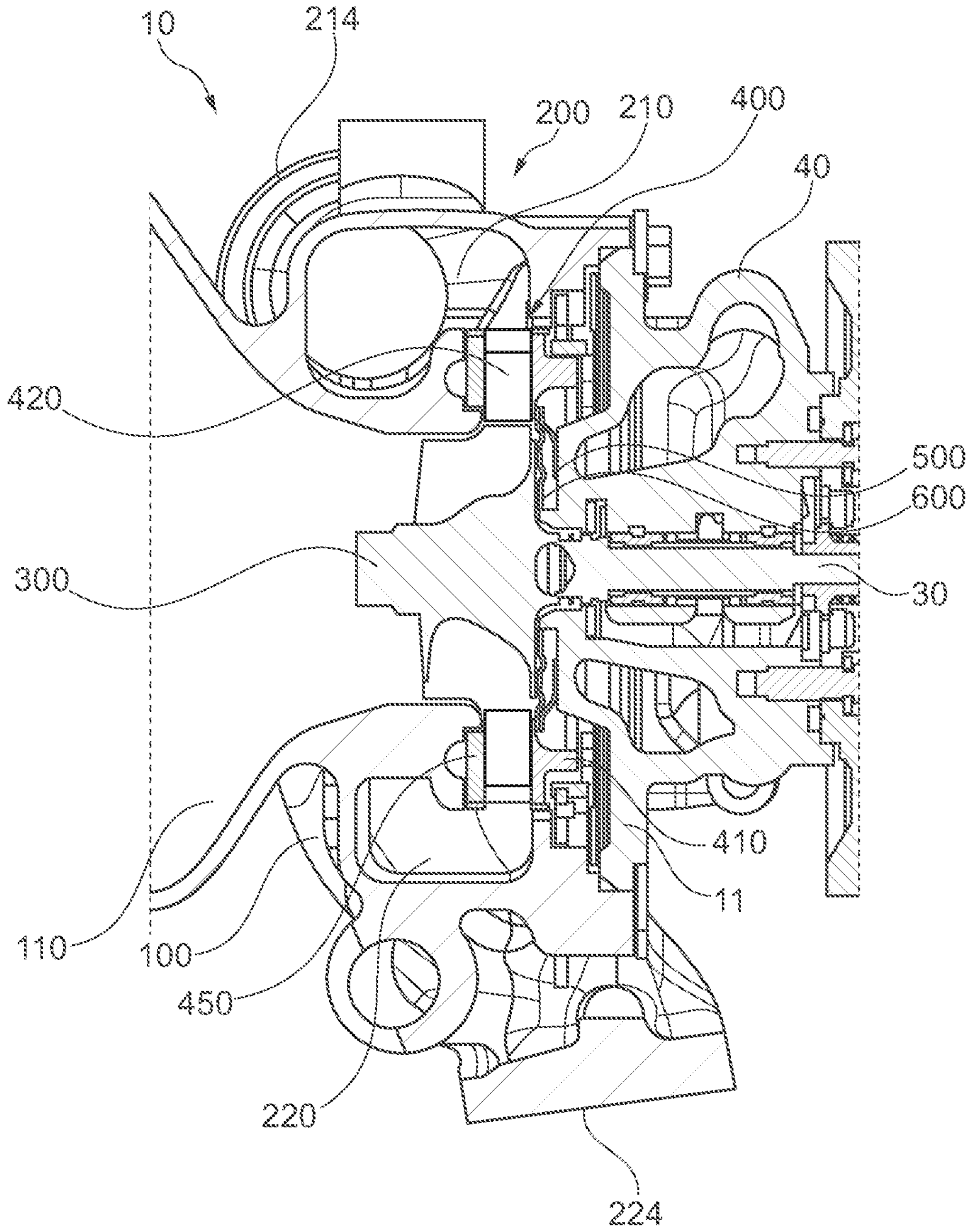
FIG. 4 shows a sectional view of the turbine according to the invention, the latter having the turbine housing from FIG. 3.

As is shown in FIGS. 4 to 5B, for example, the turbine 10 can comprise a bracing means 500 which in the axial direction 22 is disposed between the guide installation 400, in particular the carrier ring 410, and the turbine rear wall 11. The bracing means 500 can be conceived for bracing the guide installation 400 in relation to the turbine housing 100, in particular in the axial direction 22. The bracing means 500 can be configured as a plate spring. The bracing means 500 has a radially outer end and a radially inner end. The bracing means 500 on the radially outer end thereof can bear on the carrier ring 410, and on the radially inner end thereof can bear on the turbine rear wall 11. Moreover, the turbine 10 can comprise a heat shield 600. As a result of the heat shield 600, a thermal transfer from the turbine 10 to the bearing housing 40 and/or to the compressor 50 can be reduced. The heat shield 600 in the radial direction 22 can be disposed between the turbine wheel 300 and the bearing housing 40, in particular between the guide installation 400 and the bearing housing 40. More specifically, the heat shield 600 can be clamped between the bracing means 500 and the carrier ring 410. In particular, the heat shield 600 can be clamped between the carrier ring 410 and the radially outer end of the bracing means 500. The bracing means 500, by way of the heat shield 600, can bear on the carrier ring 410 so as to be in direct contact with the latter. The bracing means 500 here, conjointly with the bearing housing 40, can form a linear contact, and conjointly with the heat shield 600, in particular on the radially outer end thereof, can form a planar contact. In alternative design embodiments, however, the clamping means 500 can also bear on the carrier ring 410 so as to be in direct contact with the latter. By means of the spacer elements 460 or of the upstream guide grid 490 (if present), the pre-tension force generated by the bracing means 500 can be transmitted axially from the carrier ring 410 to the turbine housing 100 or, if present to the cover disc 450.

While the present invention has been described above and is defined in the appended claims, it is to be understood that, alternatively, the invention can also be defined in a manner corresponding to the following embodiments:

1. Turbine (10) for a charging device (1), comprising:

a turbine housing (100), wherein the turbine housing (100) comprises a feed duct assembly (200), a turbine outlet duct (110) and a receptacle space (120), wherein the receptacle space (120) is fluidically connected to the feed duct assembly (200) and the turbine outlet duct (110);

a turbine wheel (300) which, in the receptacle space (120), is disposed between the feed duct assembly (200) and the turbine outlet duct (110), and a guide installation (400), wherein the guide installation (400) in the receptacle space (120) is disposed radially outside the turbine wheel (300) and circumferentially surrounds the turbine wheel (300);

wherein the feed duct assembly (200) comprises:

a first feed duct (210) having a first fluid inlet portion (211) and a first fluid outlet portion (212);

a second feed duct (220) having a second fluid inlet portion (221) and a second fluid outlet portion (222);

wherein the first fluid outlet portion (212) extends across a first angular range (a1) about the guide installation (400); and wherein the second fluid outlet portion (222) extends across a second angular range ($\alpha$2) about the guide installation (400), characterized in that the first angular range (a1) is larger than the second angular range ($\alpha$2); and in that the first fluid inlet portion (211) and the second fluid inlet portion (221) are mutually spaced apart in the circumferential direction (26).

2. Turbine (10) according to embodiment 1, characterized in that the first feed duct (210) defines a first tongue end (213) between the first fluid inlet portion (211) and the first fluid outlet portion (212), and in that the second feed duct (220) defines a second tongue end (223) between the second fluid inlet portion (221) and the second fluid outlet portion (222).

3. Turbine (10) according to embodiment 2, characterized in that the first angular range (a1) between the first tongue end (213) and the second tongue end (223) is measured in relation to a rotation axis (R) of the turbine wheel (300), and in that the second angular range ($\alpha$2) between the second tongue end (223) and the first tongue end (213) is measured in relation to a rotation axis (R) of the turbine wheel (300).

4. Turbine (10) according to one of the preceding embodiments, characterized in that the first fluid outlet portion (212) and the second fluid outlet portion (222) are of an asymmetric design.

5. Turbine (10) according to one of the preceding embodiments, characterized in that the first feed duct (210) is able to be connected to a first cylinder group (4) of an internal combustion engine (3), and in that the second feed duct (220) is able to be connected to a second cylinder group (5) of the internal combustion engine (3).

6. Turbine (10) according to one of the preceding embodiments, characterized in that the first fluid inlet portion (211) has a first inlet (214), and the second fluid inlet portion (221) has a second inlet (224), wherein the first inlet (214) and the second inlet (224) in the circumferential direction (26) are spaced apart by an inlet portion angle ($\beta$), in particular wherein the inlet portion angle ($\beta$) is more than 10°, more specifically more than 20°, in particular more than 45°.

7. Turbine (10) according to one of embodiments 2 to 6, characterized in that a first tongue spacing (z1) is defined between an external circumference (401) of the guide installation (400) and the first tongue end (213), and in that a second tongue spacing (z2) is defined between the external circumference (401) of the guide installation (400) and the second tongue end (223), in particular wherein the first tongue spacing (213) and the second tongue spacing (223) are in each case measured in the radial direction (24) in relation to the rotation axis (R) of the turbine wheel (300).

8. Turbine (10) according to one of preceding embodiments 2 to 7, characterized in that the first fluid outlet portion (212) has a first portion length (l1), and in that the second fluid outlet portion (222) has a second portion length (l2), in particular wherein the first portion length (l1) between the first tongue end (213) and the second tongue end (223) is measured along a central axis of the first fluid outlet portion (212), and in particular wherein the second portion length (l2) between the second tongue end (223) and the first tongue end (213) is measured along a central axis of the second fluid outlet portion (222).

9. Turbine (10) according to one of preceding embodiments 2 to 8, characterized in that the first fluid outlet portion (212) has a first portion volume (V1), and in that the second fluid outlet portion (222) has a second portion volume (V2), in particular wherein the first portion volume (V1) and the second portion volume (V2) are in each case defined between the first tongue end (213) and the second tongue end (223).

10. Turbine (10) according to one of preceding embodiments 2 to 9, characterized in that the first feed duct (210) has a first duct cross-sectional area (A1) and the second feed duct (220) has a second duct cross-sectional area (A2), in particular wherein the first duct cross-sectional area (A1) on the first tongue end (213) is smaller than the second duct cross-sectional area (A2) on the second tongue end (223).

11. Turbine (10) according to one of the preceding embodiments, characterized in that the first fluid outlet portion (212) forms a first volute and the second fluid outlet portion (222) forms a second volute, wherein the first volute and the second volute are designed and disposed in such a manner that a fluid mass flow between the first fluid outlet portion (212) and the second fluid outlet portion (222) is impeded upstream of the guide installation (400).

12. Turbine (10) according to one of the preceding embodiments, characterized in that the first fluid outlet portion (212) and the second fluid outlet portion (222) are of a spiral-shaped design.

13. Turbine (10) according to one of the preceding embodiments, characterized in that the first angular range (a1) is between 181° and 250°, in particular between 185° and 220°.

14. Turbine (10) according to one of embodiments 7 to 13, characterized in that the first tongue spacing (z1) is smaller than the second tongue spacing (z2), wherein a ratio of the first tongue spacing (z1) to the second tongue spacing (z2) is between 0.80 and 1.00, in particular between 0.85 and 0.98.

15. Turbine (10) according to one of embodiments 7 to 14, characterized in that a ratio of the first tongue spacing (z1) to a diameter (d) of the turbine wheel (300) is between 0.05 and 0.25, in particular between 0.10 and 0.18.

16. Turbine (10) according to one of embodiments 8 to 15, characterized in that the first portion length (l1) is larger than the second portion length (l2), and in that a ratio of the first portion length (l1) to the second portion length (l2) is between 1.02 and 1.3, in particular between 1.05 and 1.20.

17. Turbine (10) according to one of embodiments 9 to 16, characterized in that the first portion volume (V1) is smaller than the second portion volume (V2), in particular wherein a ratio of the first portion volume (V1) to the second portion volume (V2) is between 0.70 and 0.98, in particular between 0.85 and 0.95.

18. Turbine (10) according to one of preceding embodiments 1 to 10, characterized in that the first fluid outlet portion (212) and the second fluid outlet portion (222) form a common volute which circumferentially surrounds the guide installation (400) and is designed in such a manner that a fluid mass flow between the first fluid outlet portion (212) and the second fluid outlet portion (222) takes place upstream of the guide installation (400).

19. Turbine (10) according to embodiment 10 or embodiment 18, characterized in that the first fluid outlet portion (212) is of a spiral-shaped design, in particular wherein the first duct cross-sectional area (A1) decreases from the first tongue end (213) towards the second tongue end (223).

20. Turbine (10) according to one of the preceding embodiments 10, 18, or 19, if dependent on embodiment 10, characterized in that the second duct cross-sectional area (A2) in a predominant region of the second fluid outlet portion (222) between the second tongue end (223) and the first tongue end (213) is almost constant.

21. Turbine (10) according to one of preceding embodiments 1 to 10 or 18 to 20, characterized in that the first angular range (α1) is between 200° and 280°, in particular between 220° and 260°.

22. Turbine (10) according to one of preceding embodiments 7 to 10 or 18 to 21, if dependent on embodiment 7, characterized in that the first tongue spacing (z1) is larger than the second tongue spacing (z2), in particular wherein a ratio of the first tongue spacing (z1) to the second tongue spacing (z2) is between 1.20 and 1.90, in particular between 1.50 and 1.70.

23. Turbine (10) according to one of preceding embodiments 7 to 10 or 18 to 22, if dependent on embodiment 7, characterized in that a ratio of the first tongue spacing (z1) to a diameter (d) of the turbine wheel (300) is between 0.25 and 0.50, in particular between 0.35 and 0.45.

24. Turbine (10) according to one of preceding embodiments 8 to 10 or 18 to 23, if dependent on embodiment 8, characterized in that the first portion length (l1) is larger than the second portion length (l2), and in that a ratio of the first portion length (l1) to the second portion length (l2) is between 2.20 and 3.00, in particular between 2.50 and 2.75.

25. Turbine (10) according to one of preceding embodiments 9, 10 or 18 to 24, if dependent on embodiment 9, characterized in that the first portion volume (V1) is larger than the second portion volume (V2), in particular wherein a ratio of the first portion volume (V1) to the second portion volume (V2) is between 1.70 and 2.50, in particular between 2.05 and 2.25.

26. Turbine (10) according to one of the preceding embodiments, characterized in that the guide installation (400) comprises a carrier ring (410); and in that the guide installation (400) comprises a plurality of adjustable guide vanes (420), wherein the adjustable guide vanes (420) are rotatably mounted in the carrier ring (410);

and/or in that the guide installation (400) comprises a plurality of fixed guide vanes, wherein the fixed guide vanes are fixedly disposed on the carrier ring (410) so as to be in a predetermined orientation.

27. Turbine (10) according to embodiment 26, characterized in that the plurality of adjustable guide vanes (420) and/or the plurality of fixed guide vanes are disposed between the feed duct assembly (200) and the turbine wheel (300) and circumferentially surround the turbine wheel (300), in particular such that fluid from the feed duct assembly (200) is directed by way of the plurality of adjustable guide vanes (420) and/or by way of the plurality of fixed guide vanes onto the turbine wheel (300) during operation.

28. Turbine (10) according to embodiment 26 or embodiment 27, characterized in that the adjustable guide vanes (420) are disposed in the region of the first fluid outlet portion (212) or in the region of the second fluid outlet portion (222), and in that the fixed guide vanes are disposed in the region of the respective other first fluid outlet portion (212) or second fluid outlet portion (222).

29. Turbine (10) according to one of embodiments 26 to 28, characterized in that the guide installation (400) comprises a plurality of adjustable guide vanes (420) and an adjustment ring (470), wherein the adjustable guide vanes (420) are rotatably mounted in the carrier ring (410), wherein the adjustment ring (470) comprises a plurality of coupling regions (480), and wherein each adjustable guide vane (420) of the plurality of adjustable guide vanes (420) is connected in a rotationally fixed manner to a respective vane lever (440), in particular wherein each vane lever (440) is in each case at least partially received in a coupling region (480) for adjusting the respective adjustable guide vane (420).

30. Turbine (10) according to embodiment 29, characterized in that the adjustable guide vane (420) is connected in a rotationally fixed manner to a vane shaft (430) on a first end of the vane shaft (430), and in that the vane lever (440) is connected to the vane shaft (430) on a second end of the vane shaft (430) that lies opposite the first end.

31. Turbine (10) according to embodiment 29 or embodiment 30, characterized in that each vane lever (440) has a radial vane lever portion (441) which extends radially from the vane shaft (430), and an axial vane lever portion (442) which extends axially towards the adjustment ring (470) from the radial vane lever portion (441), in particular wherein the axial vane lever portion (442) extends axially at least partially into the respective coupling region (480).

32. Turbine (10) according to one of embodiments 26 to 31, characterized in that the guide installation (400) comprises a cover disc (450) which is disposed so as to be parallel to the carrier ring (410), wherein the plurality of adjustable guide vanes (420) and/or the plurality of fixed guide vanes are/is disposed between the cover disc (450) and the carrier ring (410).

33. Turbine (10) according to one of embodiments 30 to 32, characterized in that the adjustable guide vanes (420) are rotatably mounted in the carrier ring (410) so as to be uniformly distributed across the vane shafts (430) in the circumferential direction (26).

34. Turbine (10) according to one of embodiments 29 to 33, characterized in that the guide installation (400) has an odd number of adjustable guide vanes (420).

35. Turbine (10) according to one of embodiments 32 to 34, if dependent on embodiment 29, characterized in that the guide installation (400) has a plurality of spacer elements (460) which are disposed on the carrier ring (410) so as to be distributed in the circumferential direction (26) in such a manner that said spacer elements (460) can define an axial spacing (461) of the carrier ring (410) from the cover disc (450), in particular wherein the plurality of space elements (460) comprise at least three spacer elements (460).

36. Turbine (10) according to one of embodiments 29 to 35, characterized in that the plurality of adjustable guide vanes (420) are adjustable, in particular by means of a movement of the adjustment ring (470) in the circumferential direction (26), between a first position, which corresponds to a position of the guide installation (400) opened to the maximum, and a second position, which corresponds to a position of the guide installation (400) opened to the minimum.

37. Turbine (10) according to embodiment 36, furthermore comprising an actuating installation (60) which is operatively coupled to the adjustment ring (470) and conceived for moving the adjustment ring (470) in the circumferential direction (26), in particular wherein the actuating installation (60) is coupled to the adjustment ring (470) by way of one or a plurality of levers and/or a control bar.

38. Turbine (10) according to one of embodiments 29 to 34, 36 or 37, characterized in that the guide installation (400) further comprises an upstream guide grid (490) which circumferentially surrounds the carrier ring (410) and/or the plurality of adjustable guide vanes (420), wherein the upstream guide grid (490) can have a plurality of fixed, flow-optimized spacer members (491), wherein the fixed, flow-optimized spacer members (491) are in each case disposed between two adjacent adjustable guide vanes (420), in particular adjacent to the external circumference (401) of the guide installation (400).

39. Turbine (10) according to one of the preceding embodiments, characterized in that the turbine (10) is a radial turbine.

40. Turbine (10) according to one of embodiments 26 to 39, furthermore comprising a bracing means (500), wherein the bracing means (500) in the axial direction (22) is disposed between the guide installation (400), in particular the carrier ring (410), and a turbine rear wall (11), in particular wherein the bracing means (500) is conceived for bracing the guide installation (400) in relation to the turbine housing (100).

41. Turbine (10) according to embodiment 40, characterized in that the bracing means (500) on the radially outer end thereof bears on the carrier ring (410) and on the radially inner end thereof bears on the turbine rear wall (11).

42. Turbine (10) according to embodiment 40 or embodiment 41, characterized in that a heat shield (600) is clamped between the bracing means (500) and the carrier ring (410).

43. Turbine (10) according to one of embodiments 40 to 42, characterized in that the turbine rear wall (11) is configured as part of a bearing housing (40).

44. Charging device (2) for an internal combustion engine (3) or a fuel cell, comprising:

- a bearing housing (40);
- a shaft (30) which is rotatably mounted in the bearing housing (40);
- a compressor (50) having a compressor wheel (52); and
- a turbine (10) according to one of embodiments 1 to 43, wherein the turbine wheel (300) and the compressor wheel (52) at opposite ends of the shaft (30) are coupled in a rotationally fixed manner to the shaft (30).

45. Charging device (2) according to embodiment 44, characterized in that the compressor (50) comprises a compressor housing (51) in which the compressor wheel (52) is disposed, wherein the bearing housing (40) is connected to the turbine housing (100) and to the compressor housing (52).

46. Charging device (2) according to embodiment 44 or embodiment 45, furthermore comprising an electric motor which is disposed in a motor space in the bearing housing (40), wherein the turbine wheel (300) and/or the compressor wheel (52) are/is coupled to the electric motor by way of the shaft (30).

47. Engine system (1), comprising:

- an internal combustion engine (3) having a first cylinder group (4) and a second cylinder group (5);
- a charging device (2) according to one of embodiments 44 to 46, characterized in that the first feed duct (210) downstream of the internal combustion engine is fluidically connected to the first cylinder group (4), and in that the second feed duct (220) downstream of the internal combustion engine is fluidically connected to the second cylinder group (5).

48. Engine system (1) according to embodiment 47, characterized in that the first cylinder group (4) and the second cylinder group (5) have in each case a plurality of cylinders having in each case one combustion chamber, in particular wherein the first cylinder group (4) is disposed on a first bank of cylinders, and the second cylinder group (5) is disposed on a second bank of cylinders.

49. Engine system (1) according to embodiment 48, furthermore comprising an inlet duct (6) which is disposed upstream of the internal combustion engine (3) and is fluidically connected to the respective combustion chambers so as to feed inlet air to the combustion chambers, and an outlet duct (7) which is disposed downstream of the internal combustion engine (3) and is connected to the respective combustion chambers so as to discharge fluid, in particular exhaust gas, from the combustion chambers.

50. Engine system (1) according to embodiment 49, characterized in that the outlet duct (7) has a first outlet sub-duct (8) which is fluidically connected to the combustion chambers of the first cylinder group (4), and a second outlet sub-duct (9) which is fluidically connected to the combustion chambers of the second cylinder group (5).

51. Engine system (1) according to embodiment 50, characterized in that the turbine (10) is disposed in the outlet duct (7), in particular wherein the first feed duct (210) is fluidically connected to the first outlet sub-duct (8), and wherein the second feed duct (220) is fluidically connected to the second outlet sub-duct (9).

52. Engine system (1) according to one of embodiments 49 to 52, characterized in that the compressor (50) is disposed in the inlet duct (6).

53. Engine system (1) according to one of embodiments 50 to 52, characterized in that a first lambda probe is disposed downstream of the first cylinder group (4), in particular in the first outlet sub-duct (8), and in that a second lambda probe is disposed downstream of the second cylinder group (5), in particular in the second outlet sub-duct (9).

The invention claimed is:

1. A turbine (10) for a charging device (1), comprising: a turbine housing (100), wherein the turbine housing (100) comprises a feed duct assembly (200), a turbine outlet duct (110) and a receptacle space (120), wherein the receptacle space (120) is fluidically connected to the feed duct assembly (200) and the turbine outlet duct (110);

a turbine wheel (300) which, in the receptacle space (120), is disposed between the feed duct assembly (200) and the turbine outlet duct (110), and a guide installation (400), wherein the guide installation (400) in the receptacle space (120) is disposed radially outside the turbine wheel (300) and circumferentially surrounds the turbine wheel (300);

wherein the feed duct assembly (200) comprises:

a first feed duct (210) having a first fluid inlet portion (211) and a first fluid outlet portion (212); and a second feed duct (220) having a second fluid inlet portion (221) and a second fluid outlet portion (222);

wherein the first fluid outlet portion (212) extends across a first angular range (α1) about the guide installation (400);

wherein the second fluid outlet portion (222) extends across a second angular range (α2) about the guide installation (400), wherein the first angular range (α1) is larger than the second angular range (α2); and wherein the first fluid inlet portion (211) and the second fluid inlet portion (221) are mutually spaced apart in the circumferential direction (26).

2. The turbine (10) according to claim 1, wherein the first feed duct (210) defines a first tongue end (213) between the first fluid inlet portion (211) and the first fluid outlet portion (212), and wherein the second feed duct (220) defines a second tongue end (223) between the second fluid inlet portion (221) and the second fluid outlet portion (222).

3. The turbine (10) according to claim 1, wherein the first fluid outlet portion (212) and the second fluid outlet portion (222) are of an asymmetric design.

4. The turbine (10) according to claim 1, wherein the first fluid inlet portion (211) has a first inlet (214), and the second fluid inlet portion (221) has a second inlet (224), wherein the first inlet (214) and the second inlet (224) in the circumferential direction (26) are spaced apart by an inlet portion angle (β), wherein the inlet portion angle (β) is more than 10°.

5. The turbine (10) according to claim 4, that wherein the inlet portion angle (β) is more than 20°.

6. The turbine (10) according to claim 2, wherein a first tongue spacing (z1) is defined between an external circumference (401) of the guide installation (400) and the first tongue end (213), and a second tongue spacing (z2) is defined between the external circumference (401) of the guide installation (400) and the second tongue end (223), wherein the first tongue spacing (213) and the second tongue spacing (223) are in each case measured in the radial direction (24) in relation to the rotation axis (R) of the turbine wheel (300).

7. The turbine (10) according to claim 2, wherein the first fluid outlet portion (212) has a first portion length (l1), and in that the second fluid outlet portion (222) has a second portion length (l2), wherein the first portion length (l1) between the first tongue end (213) and the second tongue end (223) is measured along a central axis of the first fluid outlet portion (212), and wherein the second portion length (l2) between the second tongue end (223) and the first tongue end (213) is measured along a central axis of the second fluid outlet portion (222).

8. The turbine (10) according to claim 2, wherein the first fluid outlet portion (212) has a first portion volume (V1), and the second fluid outlet portion (222) has a second portion volume (V2), wherein the first portion volume (V1) and the second portion volume (V2) are in each case defined between the first tongue end (213) and the second tongue end (223).

9. The turbine (10) according to claim 2 wherein the first feed duct (210) has a first duct cross-sectional area (A1) and the second feed duct (220) has a second duct cross-sectional area (A2), wherein the first duct cross-sectional area (A1) on the first tongue end (213) is smaller than the second duct cross-sectional area (A2) on the second tongue end (223).

10. The turbine (10) according to claim 1, wherein the first fluid outlet portion (212) forms a first volute and the second fluid outlet portion (222) forms a second volute, wherein the first volute and the second volute are designed and disposed in such a manner that a fluid mass flow between the first fluid outlet portion (212) and the second fluid outlet portion (222) is impeded upstream of the guide installation (400).

11. The turbine (10) according to claim 1, wherein the first fluid outlet portion (212) and the second fluid outlet portion (222) are of a spiral-shaped design.

12. The turbine (10) according to claim 1, wherein the first angular range (α1) is in the range from 181° to 250°.

13. The turbine (10) according to claim 6, wherein the first tongue spacing (z1) is smaller than the second tongue spacing (z2), wherein a ratio of the first tongue spacing (z1) to the second tongue spacing (z2) is in the range from 0.85 to 0.98.

14. The turbine (10) according to claim 6, wherein a ratio of the first tongue spacing (z1) to a diameter (d) of the turbine wheel (300) is in the range from 0.05 to 0.25.

15. The turbine (10) according to claim 7, wherein the first portion length (l1) is larger than the second portion length (l2), and wherein a ratio of the first portion length (l1) to the second portion length (l2) is in the range from 1.02 to 1.3.

16. The turbine (10) according to claim 8, wherein the first portion volume (V1) is smaller than the second portion volume (V2), wherein a ratio of the first portion volume (V1) to the second portion volume (V2) is in the range from 0.70 to 0.98.

17. The turbine (10) according to claim 1, wherein the first fluid outlet portion (212) and the second fluid outlet portion (222) form a common volute which circumferentially surrounds the guide installation (400) and is designed in such a manner that a fluid mass flow between the first fluid outlet portion (212) and the second fluid outlet portion (222) takes place upstream of the guide installation (400).

18. The turbine (10) according to claim 17, wherein the first feed duct (210) has a first duct cross-sectional area (A1) and the second feed duct (220) has a second duct cross-sectional area (A2), wherein the first duct cross-sectional area (A1) on the first tongue end (213) is smaller than the second duct cross-sectional area (A2) on the second tongue end (223), and wherein the first fluid outlet portion (212) is of a spiral-shaped design, wherein the first duct cross-sectional area (A1) decreases from the first tongue end (213) towards the second tongue end (223).

19. The turbine (10) according to claim 17, wherein the first feed duct (210) has a first duct cross-sectional area (A1)

and the second feed duct (220) has a second duct cross-sectional area (A2), wherein the first duct cross-sectional area (A1) on the first tongue end (213) is smaller than the second duct cross-sectional area (A2) on the second tongue end (223), and wherein the second duct cross-sectional area (A2) in a predominant region of the second fluid outlet portion (222) between the second tongue end (223) and the first tongue end (213) is almost constant.

20. The turbine (10) according to claim 1, wherein the first angular range ($\alpha$1) is in the range from 200° to 280°.

21. The turbine (10) according to claim 6, wherein the first tongue spacing (z1) is larger than the second tongue spacing (z2), wherein a ratio of the first tongue spacing (z1) to the second tongue spacing (z2) is in the range from 1.20 to 1.90.

22. The turbine (10) according to claim 6, wherein a ratio of the first tongue spacing (z1) to a diameter (d) of the turbine wheel (300) is in the range from 0.25 to 0.50.

23. The turbine (10) according to claim 7, wherein the first portion length (l1) is larger than the second portion length (l2), and in that a ratio of the first portion length (l1) to the second portion length (l2) is in the range from 2.20 to 3.00.

24. The turbine (10) according to claim 8 wherein the first portion volume (V1) is larger than the second portion volume (V2), wherein a ratio of the first portion volume (V1) to the second portion volume (V2) is in the range from 1.70 to 2.50.

25. The turbine (10) according to claim 1, wherein the guide installation (400) comprises a carrier ring (410); and in that the guide installation (400) comprises a plurality of adjustable guide vanes (420), wherein the adjustable guide vanes (420) are rotatably mounted in the carrier ring (410); and/or in that the guide installation (400) comprises a plurality of fixed guide vanes, wherein the fixed guide vanes are fixedly disposed on the carrier ring (410) so as to be in a predetermined orientation.

26. A charging device (2) for an internal combustion engine (3) or a fuel cell, comprising:

a bearing housing (40);

a shaft (30) which is rotatably mounted in the bearing housing (40);

a compressor (50) having a compressor wheel (52); and a turbine (10) according to claim 1, wherein the turbine wheel (300) and the compressor wheel (52) at opposite ends of the shaft (30) are coupled in a rotationally fixed manner to the shaft (30).

27. An engine system (1), comprising:

an internal combustion engine (3) having a first cylinder group (4) and a second cylinder group (5); and a charging device (2) according to claim 26, wherein the first feed duct (210) downstream of the internal combustion engine (3) is fluidically connected to the first cylinder group (4), and the second feed duct (220) downstream of the internal combustion engine (3) is fluidically connected to the second cylinder group (5).

* * * * *